US012718157B2

(12) United States Patent
Yamazaki et al.

(10) Patent No.: US 12,718,157 B2
(45) Date of Patent: Aug. 25, 2026

(54) WORK MANAGEMENT METHOD, WORK MANAGEMENT SYSTEM, AND WORK MANAGEMENT PROGRAM

(71) Applicant: Yanmar Holdings Co., Ltd., Osaka (JP)

(72) Inventors: Ryosuke Yamazaki, Osaka (JP); Masaki Akase, Osaka (JP)

(73) Assignee: Yanmar Holdings Co., Ltd., Osaka (JP)

( * ) Notice: Subject to any disclaimer, the term of this patent is extended or adjusted under 35 U.S.C. 154(b) by 225 days.

(21) Appl. No.: 17/985,295

(22) Filed: Nov. 11, 2022

(65) Prior Publication Data

US 2023/0153709 A1 May 18, 2023

(30) Foreign Application Priority Data

Nov. 15, 2021 (JP) ................................ 2021-185535
Nov. 15, 2021 (JP) ................................ 2021-185536

(51) Int. Cl.
*G06Q 10/0631* (2023.01)

(52) U.S. Cl.
CPC .............................. *G06Q 10/06311* (2013.01)

(58) Field of Classification Search
CPC ..... G06Q 10/06311; G06Q 10/063116; G06Q 50/02; G06Q 10/0633
See application file for complete search history.

(56) References Cited

U.S. PATENT DOCUMENTS 11,954,947 B2 * 4/2024 Kaechi ................ B60R 25/1012
2013/0046525 A1 * 2/2013 Ali ...................... G05D 1/0221 703/6
2018/0308064 A1 * 10/2018 Glaser ................ G01C 21/3423
2018/0359906 A1 * 12/2018 Foster .................. G05D 1/0223
2020/0192075 A1 * 6/2020 Koornneef ................ F41G 1/30
2020/0319649 A1 * 10/2020 Unesaki ................. G06Q 50/02
2022/0058583 A1 * 2/2022 Thompson ......... G06Q 30/0214
2022/0192075 A1 * 6/2022 Kurata ................. A01B 69/006
2022/0244732 A1 8/2022 Suzuki et al.
2024/0188475 A1 * 6/2024 Kubota ................ G05D 1/6482
2025/0103059 A1 * 3/2025 Okamoto ............ G07C 5/0841

FOREIGN PATENT DOCUMENTS

EP 3340002 A1 * 6/2018 ............ A01B 69/00
JP 2020113122 A 7/2020
JP 202121 A 1/2021
WO 2016056325 A1 4/2016

* cited by examiner

*Primary Examiner* — Dylan C White
(74) *Attorney, Agent, or Firm* — Chris Mizumoto

(57) ABSTRACT

An operation management method does: acquiring a work plan that mutually associates a farm field F where a work vehicle does work, work content of the work to be done by the work vehicle at the farm field F, and a scheduled work day of the work; determining whether or not a first work plan that needs to be alerted for the work vehicle to do the work as planned in the work plan is present in plural work plans that include the work plan; and notifying work information on the first work plan, when the first work plan is present in the plural work plans.

9 Claims, 18 Drawing Sheets

FIG. 11

| Date | time | Amount | Type of pesticide | worker | machine | |
|---|---|---|---|---|---|---|
| 01/Mar 2019 | 12:00~16:00 | 183L(0.023L/m2) | xxx 20%, yyy 80% | P1 | M1 | |
| 01/Mar 2019 | 12:00~14:00 | 183L(0.023L/m2) | xxx 20%, yyy 80% | P1 | M1 | |
| 01/Mar 2019 | 08:00~20:00 | 183L(0.023L/m2) | xxx 20%, yyy 80% | P1 | M1 | |
| 01/Mar 2019 | 08:00~12:00 | 183L(0.023L/m2) | xxx 20%, yyy 80% | P1 | M1 | |

WORK MANAGEMENT METHOD, WORK MANAGEMENT SYSTEM, AND WORK MANAGEMENT PROGRAM

CROSS-REFERENCE

This application claims foreign priority of JP2021-185535 filed Nov. 15, 2021 and JP2021-185536 filed Nov. 15, 2021, the disclosures of which are hereby incorporated by reference in their entirety.

TECHNICAL FIELD

The present invention relates to a work management method, a work management system, and a work management program that manage work done by a work vehicle in a work area.

BACKGROUND ART

Conventionally, there is known a technology in which, while preliminarily storing, as a work plan, in a server, various types of work to be done in each farm field, when a worker designates a to-be-worked-on farm field at the time of causing a work vehicle to do the work, the server sends, to the worker's mobile terminal, work content of the work plan which corresponds to the designated farm field, and the worker can check the work content (see, for example, Patent Document 1). Also, there is a known technology that displays work history information such as a route (work route) used for work done in the past in each farm field, and work time of the above work, and that utilizes the above work history information when creating a work plan for doing, next time, the same work in the same farm field (see, for example, Patent Document 2).

PRIOR ART DOCUMENT

Patent Document

Patent Document 1: Japanese Patent No. 6718838
Patent Document 2: Japanese Patent No. 5889763

SUMMARY OF INVENTION

Technical Problem

However, in the conventional technologies, although the worker can check the work content immediately before causing the work vehicle do the work, the current work status cannot be reflected in the work plan in the case that, after checking the work content, the worker fails to accomplish the work as scheduled or forgets the work. Thus, on the day following the day on which the work could not be accomplished, for example, a work instruction which accords to the pre-registered work plan of the next day is sent to the worker's mobile terminal, so that work that has not progressed as planned is left undone. Thus, with the conventional technologies, it is difficult for the worker to accurately know the work status which accords to the work plan. Also, it is difficult to create a proper work plan when, for example, the target work is spraying. Specifically, the conventional technologies do not display the amount and time of a spray matter when the work plan is created, so an operator must create the work plan without considering these pieces of information. This causes such problems as that the spray work is not done as planned in the created work plan, or an improper spray matter is sprayed to the farm field.

An object of the present invention relates to a work management method, a work management system, and a work management program which can cause a worker to know a work status which accords to a work plan, and which can create a proper work plan which corresponds to a work site where the spray work is done.

Solution to Problem

One operation management method according to the present invention is a method that does: acquiring a work plan that mutually associates a work site where a work vehicle does work, work content of the work to be done by the work vehicle at the work site, and a scheduled work day of the work; determining whether or not a first work plan that needs to be alerted for the work vehicle to do the work as planned in the work plan is present in plural work plans that include the work plan; and notifying work information on the first work plan, when the first work plan is present in the plural work plans. Also, the one operation management method is a method that does: based on the target route of the work vehicle that does the spray work on the spray target object placed in the work site, calculating the spray amount of the spray matter to the spray target object and the spray time of the spray work, causing the operation terminal to display the spray amount and the spray time, and, based on the spray amount and the spray time, creating the work plan of the spray work which corresponds to the work site.

One operation management system according to the present invention, includes: an acquisition processing unit; a determination processing unit; and a notification processing unit. The acquisition processing unit acquires a work plan that mutually associates a work site where a work vehicle does work, work content of the work to be done by the work vehicle at the work site, and a scheduled work day of the work. The determination processing unit determines whether or not a first work plan that needs to be alerted for the work vehicle to do the work as planned in the work plan is present in plural work plans that include the work plan. The notification processing unit notifies work information on the first work plan, when the first work plan is present in the plural work plans. Also, the one operation management system includes a calculation processing unit, a display processing unit, and a creation processing unit. Based on the target route of the work vehicle that does the spray work on the spray target object placed in the work site, the calculation processing unit calculates the spray amount of the spray matter to the spray target object and the spray time of the spray work. The display processing unit causes the operation terminal to display the spray amount and the spray time. Based on the spray amount and the spray time, the creation processing unit creates the work plan of the spray work which corresponds to the work site.

One work management program according to the present invention is a program for causing one or more processors to do: acquiring a work plan that mutually associates a work site where a work vehicle does work, work content of the work to be done by the work vehicle at the work site, and a scheduled work day of the work; determining whether or not a first work plan that needs to be alerted for the work vehicle to do the work as planned in the work plan is present in plural work plans that include the work plan; and notifying work information on the first work plan, when the first work plan is present in the plural work plans. Also, the one work management program according to the present invention is a program for causing one or more processors to do: based on the target route of the work vehicle that does the spray work on the spray target object placed in the work site, calculating the spray amount of the spray matter to the spray target object and the spray time of the spray work, causing the operation terminal to display the spray amount and the spray time, and based on the spray amount and the spray time, creating the work plan of the spray work which corresponds to the work site.

Advantageous Effects of Invention

The present invention can provide a work management method, a work management system, and a work management program which can cause a worker to know a work status which accords to a work plan, and the work management method, the work management system, and the work management program which can create a proper work plan which corresponds to a work site where spray work is done.

BRIEF DESCRIPTION OF DRAWINGS

FIG. 11 is a diagram showing an example of a schedule screen displayed at the management operation terminal according to the embodiment of the present invention.

DESCRIPTION OF EMBODIMENTS

The following embodiments are examples of embodying the present invention, and are not intended to limit the technical scope of the present invention.

[Automatic Travel System 1]

Figure 1:
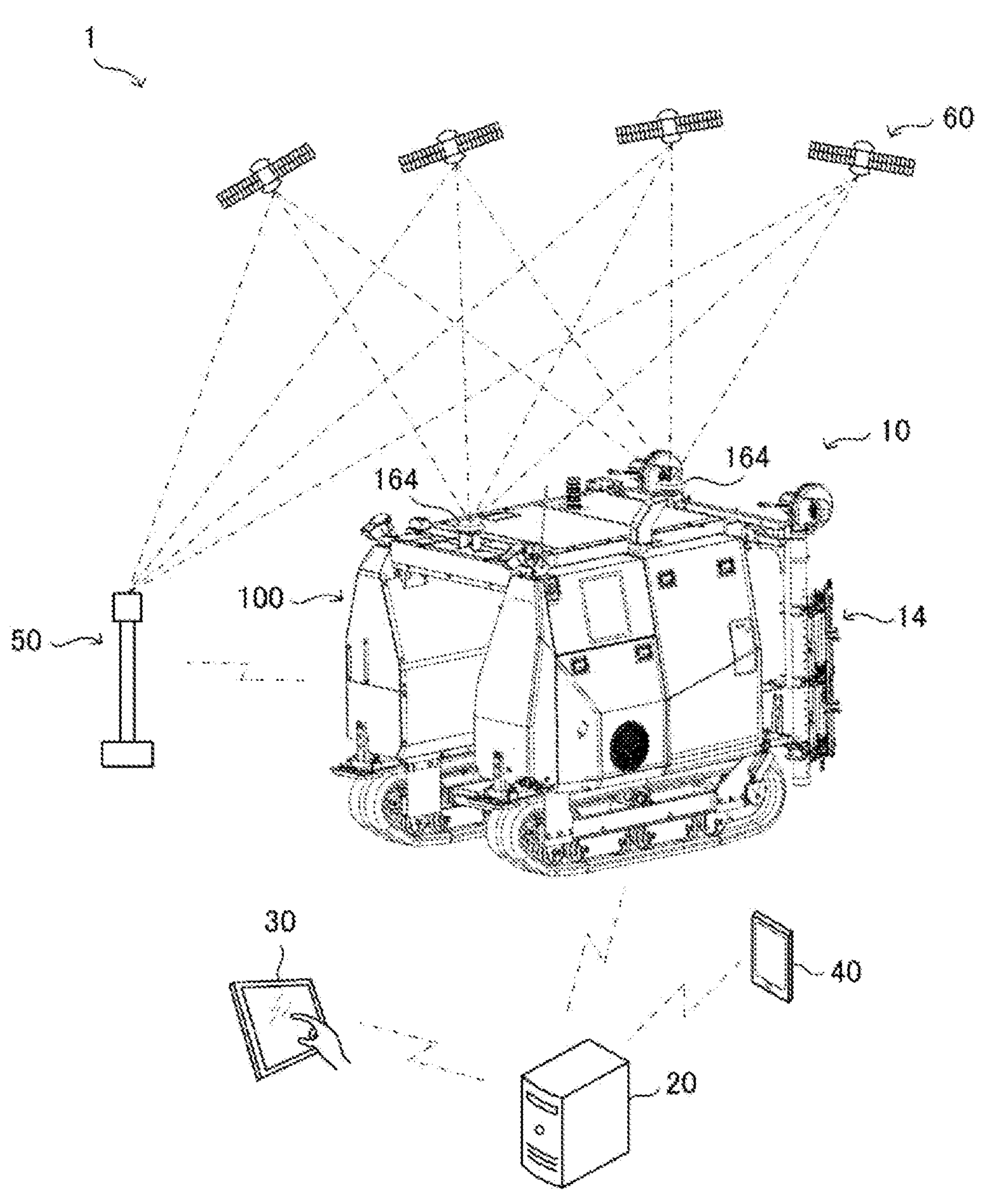
FIG. 1 is a schematic diagram showing an overall configuration of an automatic travel system according to an embodiment of the present invention.
Figure 2:
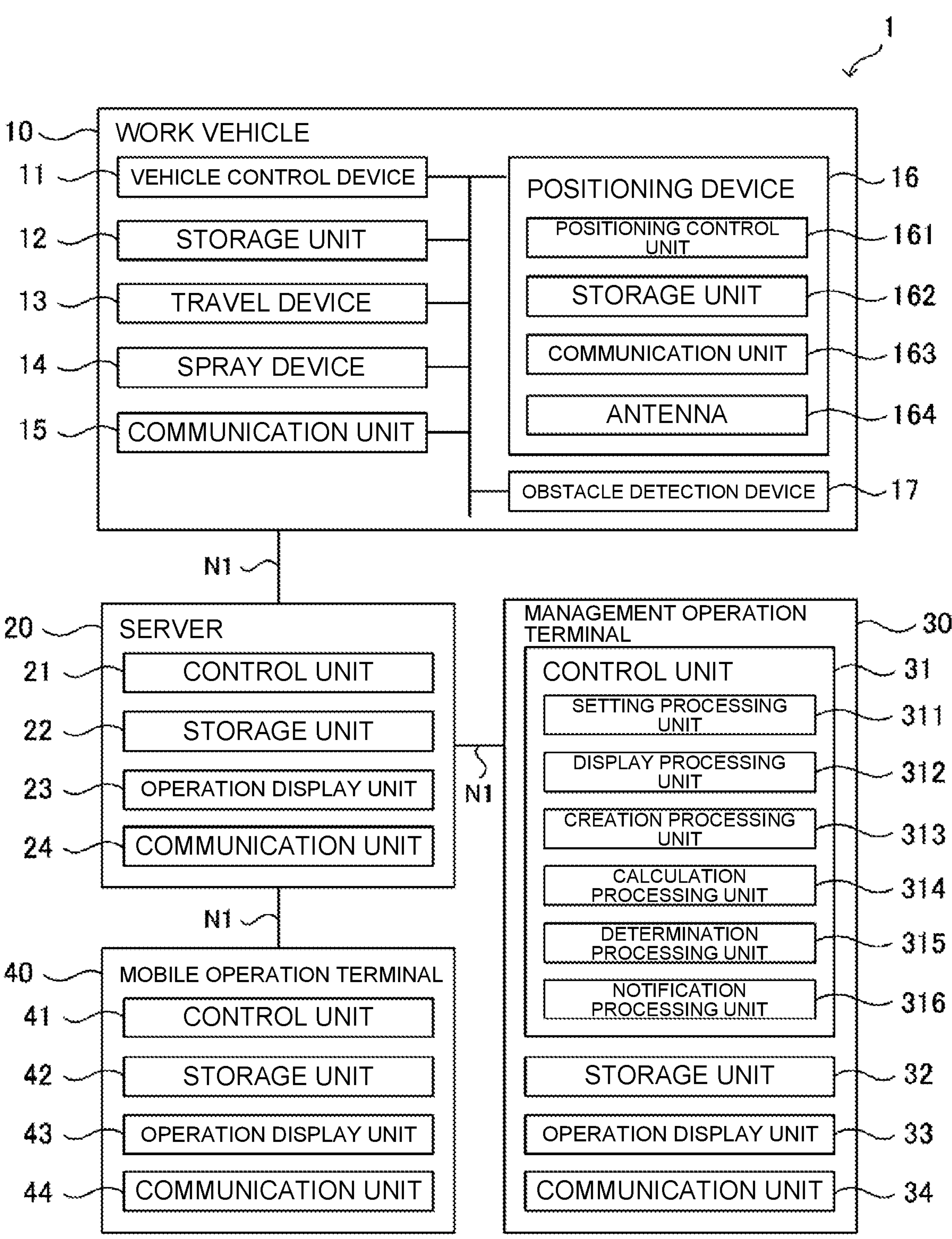
FIG. 2 is a block diagram showing a configuration of the automatic travel system according to the embodiment of the present invention.

As shown in FIGS. 1 and 2, an automatic travel system 1 according to an embodiment of the present invention includes a work vehicle 10, a server 20, a management operation terminal 30, a mobile operation terminal 40, a base station 50, and a satellite 60. The work vehicle 10, the server 20, the management operation terminal 30, and the mobile operation terminal 40 can communicate with each other via a communication network N1. For example, the server 20, the work vehicle 10, the management operation terminal 30, and the mobile operation terminal 40 can communicate with each other via a cellular telephone network, a packet network, or a wireless LAN.

In the present embodiment, a case in which the work vehicle 10 is a vehicle that does spray work to spray a spray matter such as a chemical agent (chemical solution) on a crop V (see FIG. 7) planted in a farm field F is taken as an example for the description. The farm field F is an example of a work site of the present invention, and the farm field F is an orchard such as a vineyard and an apple orchard.

The crop V is an example of a work target object of the present invention, and the crop V is a fruit tree such as a grape. The spray work is an example of the work of the present invention, and the spray work is to spray a spray matter, such as a chemical solution, water, or the like, on the crop V. As another embodiment, it is also possible that the work vehicle 10 is a vehicle that does weeding work, a vehicle that does leaf-cutting work, or a vehicle that does harvesting work. The work of the present invention may be weeding, leaf cutting, or harvesting.

Figure 7:
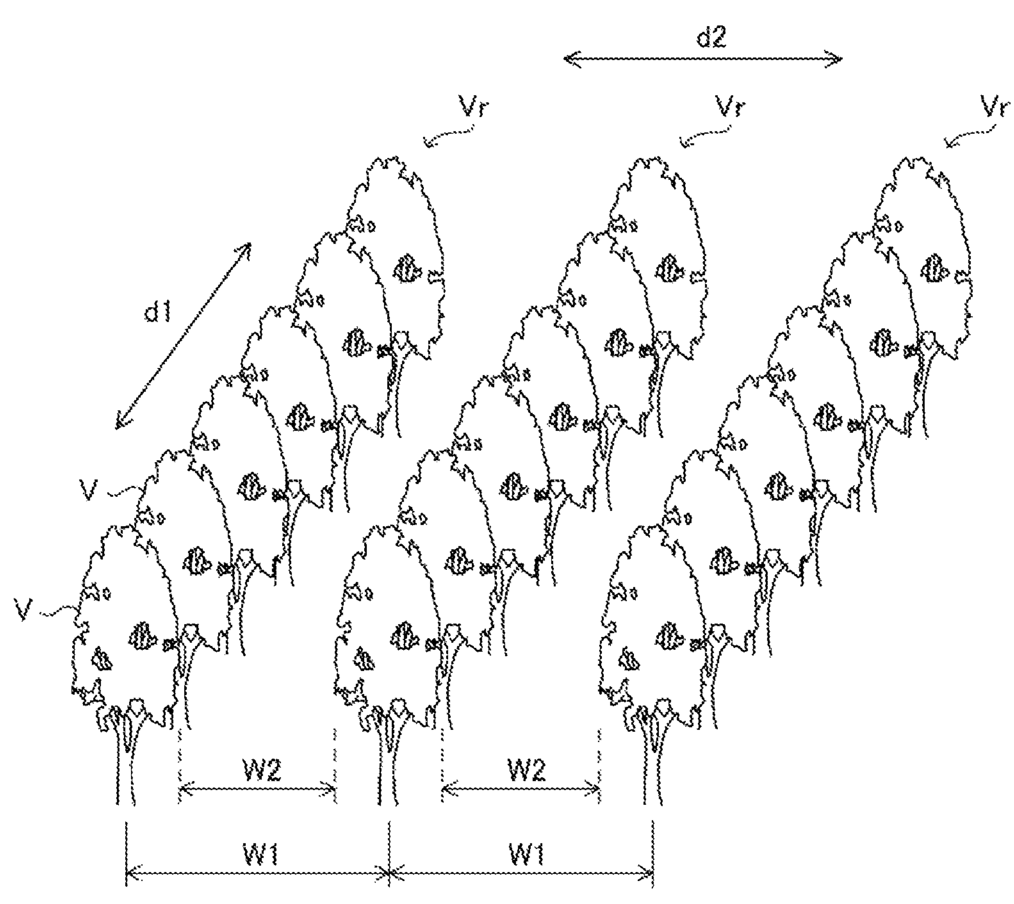
FIG. 7 is a diagram showing an example of a crop row according to the embodiment of the present invention.

The crops V are placed in a plurality of rows at a given interval in the farm field F. Specifically, as shown in FIG. 7, the plural crops V are linearly planted in a given direction (direction d1), thereby to configure a crop row Vr that includes the plural crops V linearly arranged. FIG. 7 exemplifies the crop rows Vr three in number. Each crop row Vr is placed at a given interval W1 in a row direction (direction d2). An area (space) of an interval W2 between the adjacent crop rows Vr is a work passage where the work vehicle 10 does the spray work on the crop V while traveling in the direction d1.

Figure 8:
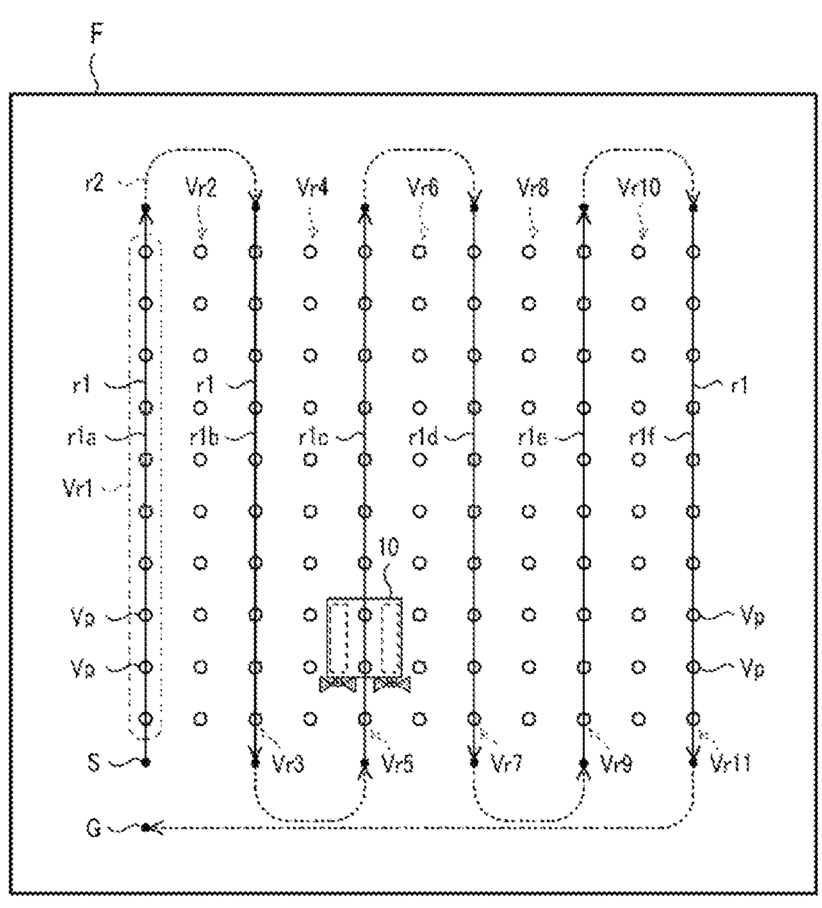
FIG. 8 is a diagram showing an example of a target route according to the embodiment of the present invention.

Also, the work vehicle 10 can do an automatic travel (autonomous travel) following a preset target route R. For example, as shown in FIG. 8, from a work start position S to a work finish position G, the work vehicle 10 does the automatic travel following the target route R which includes a work route r1 (work routes r1*a* to r1*f*) and a transfer route r2. The work route r1 is route of a straight line on which the work vehicle 10 does the spray work on the crop V, and the transfer route r2 is a route on which the work vehicle 10 moves between the crop rows Vr without doing the spray work. The transfer route r2 includes a turn route and a straight travel route, for example. In the example shown in FIG. 8, the crops V including the crop rows Vr1 to Vr11 are placed in the farm field F. In FIG. 8, a position where the crop V is planted (crop position) is shown by "Vp". Also, the work vehicle 10 traveling in the farm field F in FIG. 8 has a gate-shaped vehicle body 100 (see FIG. 6), so as to, while traveling over one crop row Vr, spray a chemical agent on the crop V of the above crop row Vr and on the crop V of the crop row Vr adjacent to the above crop row Vr. For example, as shown in FIG. 8, when the work vehicle 10 travels over the crop row Vr5, a left vehicle body (left portion 100L) of the work vehicle 10 travels through the work passage between the crop rows Vr4 and Vr5, and a right vehicle body (right portion 100R) of the work vehicle 10 travels through the work passage between the crop rows Vr5 and Vr6, and sprays the chemical agent on the crops V of the crop rows Vr4, Vr5, and Vr6.

Also, the work vehicle 10 does the automatic travel in a given order of rows. For example, the work vehicle 10 travels over the crop row Vr1, then travels over the crop row Vr3, and then travels over the crop row Vr5. In this way, the work vehicle 10 does the automatic travel in accordance with a preset order of the crop rows Vr. Note that, in the arrangement order of the crop rows Vr, the work vehicle 10 may travel on every one row or may travel on every plural rows.

The satellite 60 is a positioning satellite that is included in a satellite positioning system such as GNSS (Global Navigation Satellite System), and sends a GNSS signal (satellite signal). The base station 50 is a reference point (reference station) that is included in the satellite positioning system.

To the work vehicle 10, the base station 50 sends correction information for calculating the current position of the work vehicle 10.

A positioning device 16 installed on the work vehicle 10 uses the GNSS signal sent from the satellite 60 thereby to execute a positioning process that calculates the current position (latitude, longitude, and altitude) and current orientation of the work vehicle 10, etc. Specifically, based on positioning information (GNSS signal, etc.) which is received by two receivers (antenna 164 and base station 50) and based on the correction information which is generated by the base station 50, the positioning device 16 uses an RTK (Real Time Kinematic) method or the like for measuring the work vehicle 10's position there by to measure the work vehicle 10's position. The above positioning method is a well-known technology, and thus a detailed description thereof is omitted.

The following is a detailed description of each of component elements included in the automatic travel system 1.

[Work Vehicle 10]

Figure 3:
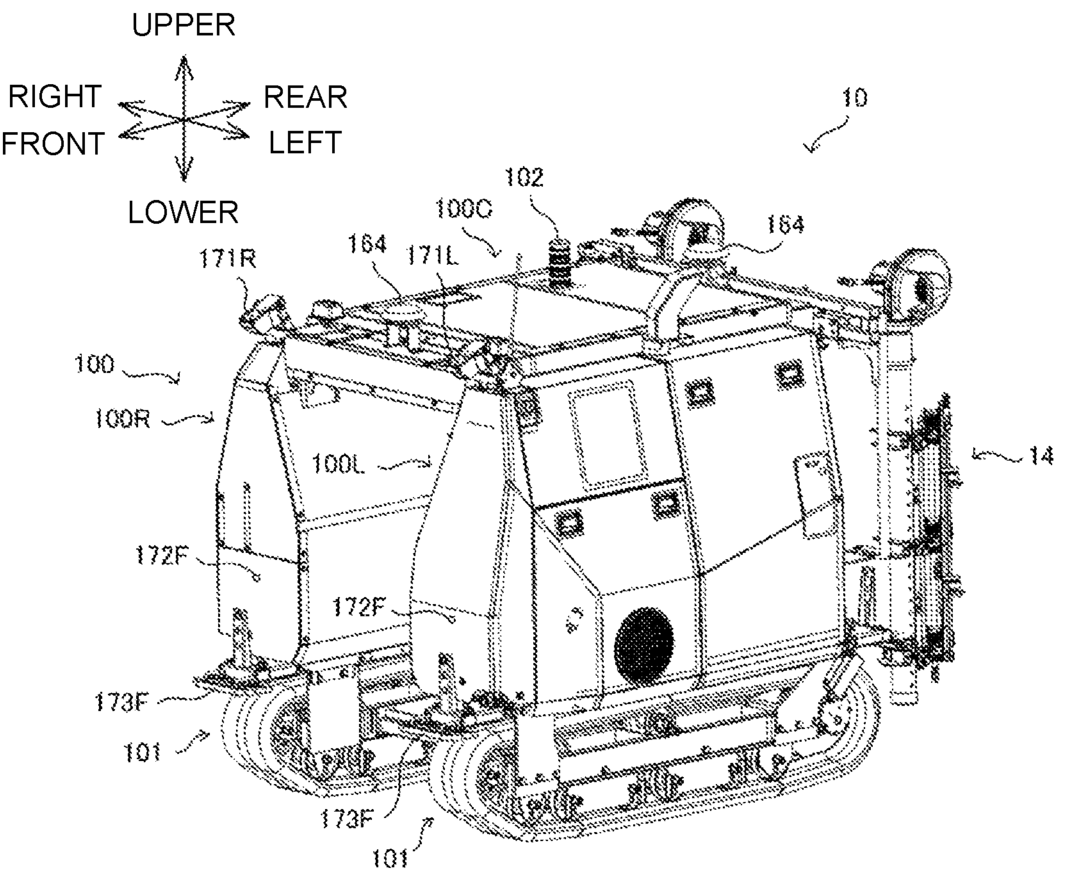
FIG. 3 is an external view of a work vehicle according to the embodiment of the present invention, viewed from the left front side.
Figure 4:
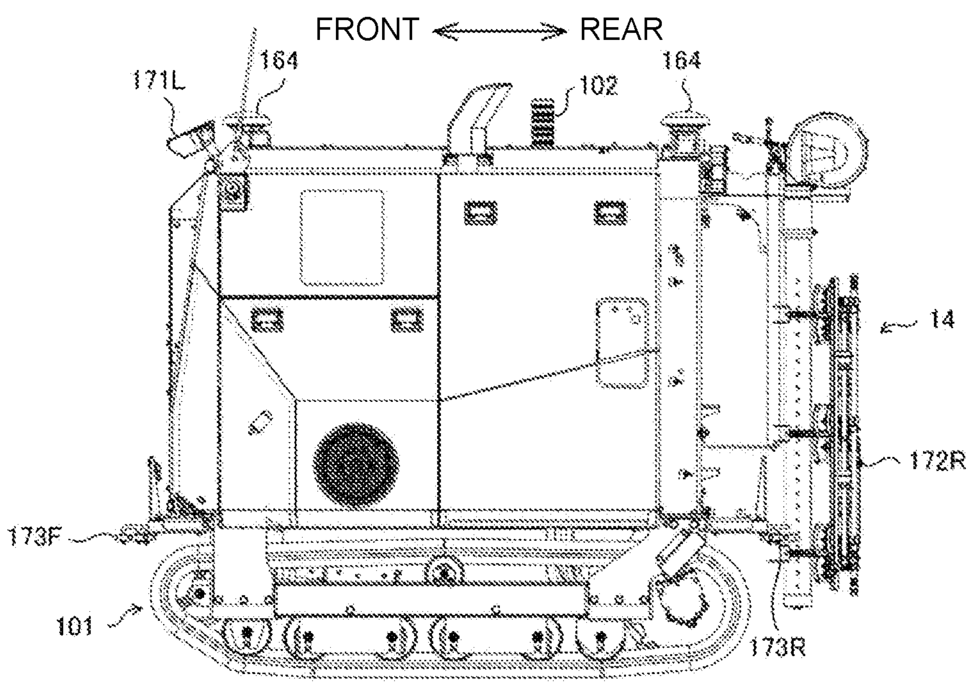
FIG. 4 is a left-side external view of the work vehicle according to the embodiment of the present invention, viewed from the left side.
Figure 5:
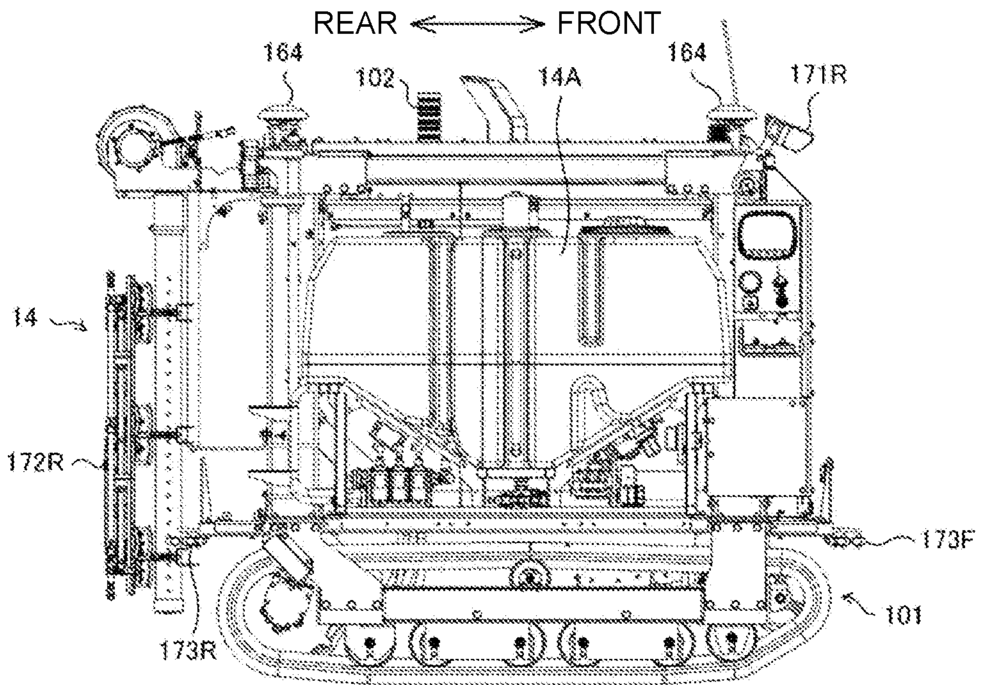
FIG. 5 is a right-side external view of the work vehicle according to the embodiment of the present invention, viewed from the right side.
Figure 6:
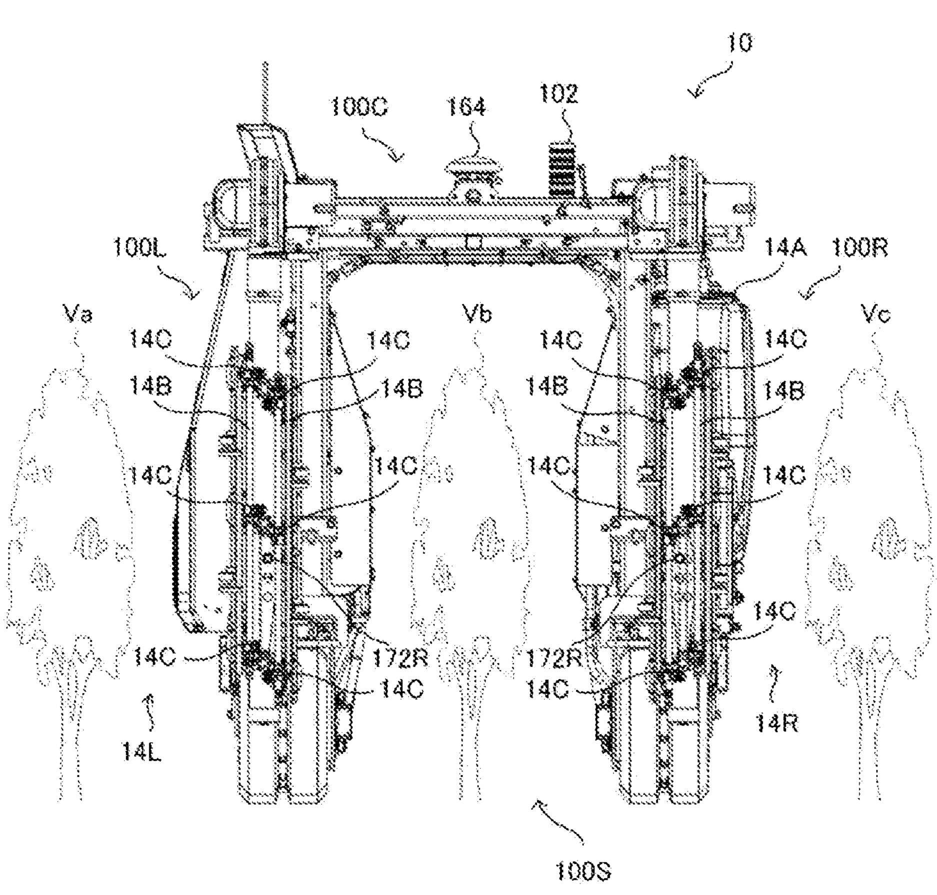
FIG. 6 is a rear external view of the work vehicle according to the embodiment of the present invention, viewed from the rear side.

FIG. 3 is an external view of the work vehicle 10, viewed from the left front side. FIG. 4 is a left-side external view of the work vehicle 10, viewed from the left side, FIG. 5 is a right-side external view of the work vehicle 10, viewed from the right side, and FIG. 6 is a rear external view of the work vehicle 10, viewed from the rear side.

As shown in FIGS. 1 to 6, the work vehicle 10 includes a vehicle control device 11, a storage unit 12, a travel device 13, a spray device 14, a communication unit 15, the positioning device 16, an obstacle detection device 17, and the like. The vehicle control device 11 is electrically connected to the storage unit 12, the travel device 13, the spray device 14, the positioning device 16, the obstacle detection device 17, and the like. Note that the vehicle control device 11 and the positioning device 16 may be capable of executing a wireless communication.

The communication unit 15 is a communication interface for connecting the work vehicle 10 to the communication network N1 by wire or wirelessly, and for executing, via the communication network N1, a data communication, which accords to a given communication protocol, with external devices such as the server 20.

The storage unit 12 is a non-volatile storage unit such as HDD (Hard Disk Drive) or SSD (solid State Drive) that stores various types of information. The storage unit 12 stores a program control that causes the vehicle control device 11 to execute a given control process (for example, automatic travel process). For example, the control program is non-transiently recorded in a computer-readable recording medium such as a CD or a DVD, and is read by a given reading device (not shown) and is stored in the storage unit 12. Also, the control program may be downloaded from a server (e.g., the server 20) via the communication network N1 to the work vehicle 10 and thereby may be stored in the storage unit 12. Also, the storage unit 12 stores the data of the target route R generated at the management operation terminal 30. For example, the data of the target route R is sent from the management operation terminal 30 to the server 20, and is transferred from the server 20 to the work vehicle 10 and thereby is stored in the storage unit 12.

The vehicle control device 11 has control devices such as a CPU, a ROM, and a RAM. The CPU is a processor that executes various types of arithmetic processes. The ROM is a non-volatile storage unit in which control programs, such as a BIOS and an OS, for causing the CPU to execute the various types of arithmetic processes are preliminarily stored. The above RAM is a volatile or non-volatile storage unit that stores various types of information and is used as a transient storage memory (work area) of the various types of processes to be executed by the above CPU. Then, the vehicle control device 11, with the CPU, executes various types of control programs preliminarily stored in the above ROM or storage unit 12, thereby to control the work vehicle 10.

The vehicle control device 11 controls the traveling of the work vehicle 10. Specifically, based on the position information showing the work vehicle 10's position measured by the positioning device 16, the vehicle control device 11 causes the work vehicle 10 to do the automatic travel following the target route R. For example, with the above positioning state capable of doing the RTK positioning, the worker does a work start operation on an operation screen of the mobile operation terminal 40 causes the mobile operation terminal 40 to output a work start instruction via the server 20 to the work vehicle 10. Acquiring the above work start instruction, the vehicle control device 11 starts the automatic travel of the work vehicle 10 based on the position information showing the work vehicle 10's position measured by the positioning device 16. Specifically, the worker, when doing the work start operation at the mobile operation terminal 40 manually moves the work vehicle 10 to the work start position S, and presses down a start button of an operation remote controller (not shown) in the work start position S. This causes the vehicle control device 11 to start the automatic travel of the work vehicle 10 from the work start position S. The work vehicle 10 starts the automatic travel following the target route R, thereby to start the spray work by the spray device 14 in the above work passage.

Also, acquiring the travel stop instruction from the mobile operation terminal 40, the vehicle control device 11 stops the automatic travel of the work vehicle 10. For example, when the worker presses down the stop button on the operation screen of the mobile operation terminal 40, the mobile operation terminal 40 outputs the above travel stop instruction via the server 20 to the work vehicle 10. Acquiring the above travel stop instruction from the mobile operation terminal 40, the vehicle control device 11 stops the automatic travel of the work vehicle 10.

Accordingly, the work vehicle 10 stops the automatic travel, and stops the spray work by the spray device 14.

The work vehicle 10 includes the gate-shaped vehicle body 100 that travels over the crops V (fruit trees) planted side by side in plural rows in the farm field F. As shown in FIG. 6, the vehicle body 100 is formed in a gate-shape with the left portion 100L, the right portion 100R, and a connection portion 100C connecting the left portion 100L with the right portion 100R, thereby to secure a space 100S, through which the crop V is allowed to pass, inside the left portion 100L, the right portion 100R, and the connection portion 100C.

The lower end portion of each of the left portion 100L and right portion 100R of the vehicle body 100 is provided with a crawler 101. The left portion 100L is provided with an engine (not shown), a battery (not shown), etc. The right portion 100R is provided with a storage tank 14A (see FIG. 5) of the spray device 14, etc. In this way, by assigning and placing the component elements on the left portion 100L and right portion 100R of the vehicle body 100, it is attempted that, in the work vehicle 10, the right/left balance is equilibrated and the center of gravity is lowered. As a result, the work vehicle 10 can stably travel on a slope or the like in the farm field F.

The travel device 13 is a drive unit that causes the work vehicle 10 to travel. The travel device 13 includes an engine, the crawler 101, etc.

In a state of being capable of doing an independent speed change by a hydro-static continuously-variable transmission device, the right and left crawlers 101 are driven by power from the engine. Accordingly, the vehicle body 100 is brought into a forward-travel state in which the right and left crawlers 101 are driven at an even speed in the forward direction thereby to travel straight in the forward direction, and is brought into a rearward-travel state in which the right and left crawlers 101 are driven at an even speed in the rearward direction thereby to travel straight in the rearward direction. Also, the vehicle body 100 is brought into a forward turn state in which the right and left crawlers 101 are driven at uneven speeds in the forward direction thereby to make a turn while traveling forward, and is brought into a rearward turn state in which the right and left crawlers 101 are driven at uneven speeds in the rearward direction thereby to make a turn while traveling rearward. Also, the vehicle body 100 is brought into a pivot turn state in which driving of any one of the right and left crawlers 101 is stopped and the other crawler 101 is driven, and is brought into a spin turn state in which the right and left crawlers 101 are driven at an even speed in the forward direction and the rearward direction. Also, the vehicle body 100 is brought into the travel stop state by stopping the driving of the right and left crawlers 101. Moreover, the right and left crawlers 101 may be configured to be electrically driven by an electric motor.

As shown in FIG. 6, the spray device 14 includes the storage tank 14A that stores the chemical agent (chemical solution), a spray pump (not shown) that pumps the chemical agent, an electric spray motor (not shown) that drives the spray pump, two spray pipes 14B vertically provided in parallel on each of the right and left sides in the rear portion of the vehicle body 100, total 12 spray nozzles 14C with three of which provided for each of the spray pipes 14B, an electronically-controlled valve unit (not shown) that changes the spray amount and spray pattern of the chemical agent, and plural spray pipes (not shown) that connect the above, etc.

Each of the spray nozzles 14C is mounted to the corresponding spray pipe 14B so as to vertically change the position.

Accordingly, regarding each of the spray nozzles 14C, an interval to the adjacent spray nozzle 14C and the height position relative to the spray pipe 14B can be changed according to the spray target object (crop V). Also, each of the spray nozzles 14C is so mounted that the height position and right/left position relative to the vehicle body 100 can be changed according to the spray target object.

Note that, regarding the spray device 14, the number of spray nozzles 14C provided for each of the spray pipes 14B can be changed in various ways according to the type of crop V, the length of each of the spray pipes 14B, etc.

As shown in FIG. 6, of the plural spray nozzles 14C, the three spray nozzles 14C provided for the leftmost spray pipe 14B leftward spray the chemical agent toward a crop Va which is positioned on the left outer side of the vehicle body 100. Of the plural spray nozzles 14C, the three spray nozzles 14C provided for the left inner spray pipe 14B which is adjacent to the leftmost spray pipe 14B rightward spray the chemical agent toward a crop Vb which is positioned in the space 100S at the center of the vehicle body 100 in the right/left direction. Of the plural spray nozzles 14C, the three spray nozzles 14C provided for the rightmost spray pipe 14B rightward spray the chemical agent toward a crop Vc which is positioned on the right outer side of the vehicle body 100. Of the plural spray nozzles 14C, the three spray nozzles 14C provided for the right inner spray pipe 14B which is adjacent to the rightmost spray pipe 14B leftward spray the chemical agent toward the crop Vb which is positioned in the space 100S.

With the above configuration, in the spray device 14, the two spray pipes 14B and six spray nozzles 14C provided at the left portion 100L of the vehicle body 100 function as the left spray portion 14L. Also, the two spray pipes 14B and six spray nozzles 14C provided at the right portion 100R of the vehicle body 100 function as the right spray portion 14R. Also, at the rear portion of the vehicle body 100, the right and left spray portions 14R and 14L, in a state of being capable of spraying in the right/left directions, are so placed as to define a right/left interval, which allows the crop Vb's passing (space 100S), between the right and left spray portions 14R and 14L.

In the spray device 14, the spray patterns by the spray portions 14R and 14L include a 4-direction spray pattern in which each of the spray portions 14R and 14L sprays the chemical agent in both right and left directions, and a direction-limited spray pattern in which a spray direction by the spray portions 14R and 14L is limited. The direction-limited spray pattern includes a left 3-direction spray pattern with which the spray portion 14L sprays the chemical agent in both the rightward and leftward directions and the spray portion 14R sprays the chemical agent only in the leftward direction, a right 3-direction spray pattern with which the spray portion 14L sprays the chemical agent only in the rightward direction and the spray portion 14R sprays the chemical agent in both the rightward and leftward directions, a 2-direction spray pattern with which the spray portion 14L sprays the chemical agent only in the rightward direction and the spray portion 14R sprays the chemical agent only in the leftward direction, a left 1-direction spray pattern with which the spray portion 14L sprays the chemical agent only in the leftward direction and the spray portion 14R does not spray the chemical agent, and a right 1-direction spray pattern with which the spray portion 14R sprays the chemical agent only in the rightward direction and the spray portion 14L does not spray the chemical agent.

Provided on the vehicle body 100 are an automatic travel control unit that causes the vehicle body 100 to do the automatic travel following the target route R in the farm field F based on the positioning information or the like which is acquired from the positioning device 16, an engine control unit that executes the control related to the engine, an HST (Hydro-Static Transmission) control unit that executes the control related to a hydro-static continuously-variable transmission device, and a work device control unit that executes the control related to the work device such as the spray device 14, etc. Each of the control units is constructed with an electronic control unit provided with a microcontroller or the like, various types of information and control programs stored in a non-volatile memory (for example, an EEPROM such as a flash memory) of the microcontroller, etc. The various types of information stored in the non-volatile memory may include the target route R that is generated in advance, etc. In the present embodiment, the respective control units are collectively referred to as the "vehicle control device 11" (see FIG. 2).

The positioning device 16 is a communication device including a positioning control unit 161, a storage unit 162, a communication unit 163, an antenna 164, etc. The antenna 164 is provided in each of the front and rear of a ceiling portion (connection portion 100C) of the vehicle body 100 (see FIG. 3). Also, the ceiling portion of the vehicle body 100 is provided with a display light 102 or the like that displays a travel state of the work vehicle 10 (see FIG. 3). Note that the above battery is connected to the positioning device 16, and the positioning device 16 can operate even when the engine is being stopped.

The communication unit 163 is a communication interface for connecting the positioning device 16 to the communication network N1 by wire or wirelessly, and for executing, via the communication network N1, a data communication, which accords to a given communication protocol, with external devices such as the base station 50.

The antenna 164 receives a radio wave (GNSS signal) sent from the satellite 60. Since the antenna 164 is provided in each of the front and rear of the work vehicle 10, the work vehicle 10's current position can be accurately measured.

The positioning control unit 161 is a computer system including one or more processors, and a storage memory such as a non-volatile memory and a RAM. The storage unit 162 is a non-volatile memory or the like that stores a control program for causing the positioning control unit 161 to execute the positioning process and that stores data such as the positioning information and movement information. The positioning control unit 161 measures the work vehicle 10's current position by a given positioning method (RTK method, etc.) based on the GNSS signal that the antenna 164 receives from the satellite 60.

The obstacle detection device 17 includes a LIDAR (Laser Imaging Detection and Ranging) sensor 171L provided on the front left side of the vehicle body 100 and a LIDAR sensor 171R provided on the front right side of the vehicle body 100 (see FIG. 3). By, for example, a TOF (Time Of Flight) method to measure a distance to a distance measurement point based on the round trip time for a laser light, which is emitted by the LIDAR sensor, to return after reaching the distance measurement point, each of the LIDAR sensors measures the distance from the LIDAR sensor to each distance measurement point (measurement target object) in a measurement range.

For the LIDAR sensor 171L, a given range on the front left side of the vehicle body 100 is set as the measurement range, and, for the LIDAR sensor 171R, a given range on the front right side of the vehicle body 100 is set as the measurement range. To the vehicle control device 11, each LIDAR sensor sends measurement information, such as the measured distance to each distance measurement point and a scanning angle (coordinate) relative to each distance measurement point.

Also, the obstacle detection device 17 includes right and left ultrasonic sensors 172F (see FIG. 3) provided on the front side of the vehicle body 100, and right and left ultrasonic sensors 172R (see FIG. 4 and FIG. 5) provided on the rear side of the vehicle body 100. The TOF method to measure the distance to the distance measurement point based on the round trip time for an ultrasonic wave, which is sent by the ultrasonic sensor, to return after reaching the distance measurement point measures the distance from the ultrasonic sensor to the measurement target object.

For the ultrasonic sensor 172F on the front left side, a given range on the front left side of the vehicle body 100 is set as the measurement range, for the ultrasonic sensor 172F on the front right side, a given range on the front right side of the vehicle body 100 is set as the measurement range, for the ultrasonic sensor 172R on the rear left side, a given range on the rear left side of the vehicle body 100 is set as the measurement range, and for the ultrasonic sensor 172R on the rear right side, a given range on the rear right side of the vehicle body 100 is set as the measurement range. To the vehicle control device 11, each ultrasonic sensor sends the measurement information which includes the measured distance to the measured measurement target object and the direction of the measurement target object.

Also, the obstacle detection device 17 includes right and left contact sensors 173F (see FIG. 3) provided on the front side of the vehicle body 100, and the right and left contact sensors 173R (see FIG. 4 and FIG. 5) provided on the rear side of the vehicle body 100. When an obstacle comes into contact with the contact sensor 173F on the front side of the vehicle body 100, the contact sensor 173F detects the obstacle. The spray device 14 is provided in front (rear side of the work vehicle 10) of the contact sensors 173R on the rear side of the vehicle body 100, and, when the obstacle comes into contact with the spray device 14, the spray device 14 moves to the rear (the front side of the work vehicle 10) and thereby the contact sensor 173R detects the obstacle. Each contact sensor, when detecting the obstacle, sends a detection signal to the vehicle control device 11.

Based on the obstacle's measurement information acquired from the obstacle detection device 17, the vehicle control device 11 executes an avoidance process to avoid the obstacle when there is a possibility that the work vehicle 10 should collide with the obstacle.

The above configuration makes it possible to cause the work vehicle 10 to accurately do the automatic travel following the target route R, and properly do the chemical solution agent's spray work by the spray device 14.

The above configuration of the work vehicle 10 is a configuration example of the work vehicle of the present invention, and the present invention is not limited to the above configuration. The work vehicle 10 is a vehicle which, while traveling over the first crop row Vr, can do the spray work in which the spray matter is sprayed on the above first crop row Vr as well as the second crop row Vr in each of the right and left directions of the first crop row Vr. As another embodiment, it is also possible that the work vehicle 10, instead of having the gate-shape of the vehicle body 100, has a normal shape in which the entire vehicle body 100 travels between the crop rows Vr (work passage). In this case, the work vehicle 10 sequentially does the automatic travel in each work passage without straddling the crop row Vr. Also, the spray device 14 includes one spray portion, and does the spray work by switching the spray pattern in which the chemical agent is sprayed in the right and left directions, the spray pattern in which the chemical agent is sprayed only in the left direction, and the spray pattern in which the chemical agent is sprayed only in the right direction.

[Management Operation Terminal 30]

As shown in FIG. 2, the management operation terminal 30 is an information processing device that includes a control unit 31, a storage unit 32, an operation display unit 33, a communication unit 34, etc. The management operation terminal 30 is, for example, a personal computer (PC), a tablet terminal, or the like. The management operation terminal 30 is operated, for example, by a farm field manager who manages the farm field F. The farm field manager operates the management operation terminal 30, thereby to register information on the work (e.g., spraying) in the farm field F or to generate the target route R. Also, the farm field manager operates the management operation terminal 30, thereby to create a work plan of the work in the farm field F. Also, the worker who works in the farm field F operates the management operation terminal 30, thereby to check the work plan, the work status, etc. The management operation terminal 30 is an example of the operation terminal of the present invention.

The communication unit 34 is a communication interface for connecting the management operation terminal 30 to the communication network N1 by wire or wirelessly, and for executing, via the communication network N1, a data communication, which accords to a given communication protocol, with external devices such as the server 20.

The operation display unit 33 is a user interface that includes a display unit, such as a liquid crystal display or an organic EL display, that displays various types of information, and an operation unit, such as a touch screen, mouse, or keyboard, that accepts an operation. On an operation screen displayed on the display unit, the farm field manager, by operating the operation unit, can register various types of information (work vehicle information, farm field information, work information, or the like to be described below) and can create the work plan. Also, the worker, by operating the operation unit, can do the work start operation, a travel stop operation, etc., on the work vehicle 10. Also, at a place away from the work vehicle 10, the worker, by the travel track and the vehicle body 100's surrounding image which are displayed at the management operation terminal 30, can know the travel state, work status, and surrounding status of the work vehicle 10 that is doing the automatic travel in the farm field F following the target route R.

The storage unit 32 is a non-volatile storage unit, such as an HDD or an SSD, that stores various types of information. The storage unit 32 stores a control program such as a work management program for causing the control unit 31 to execute a work management process (see FIGS. 20 and 21) described below. For example, the above work management program is non-transiently recorded in a computer-readable recording medium such as a CD or a DVD, and is read by a given reading device (not shown) and is stored in the storage unit 32. Note that the above work management program may be downloaded from a server (not shown) via the communication network N1 to the management operation terminal 30 and thereby may be stored in the storage unit 32.

The control unit 31 includes control devices such as a CPU, a ROM, and a RAM. The CPU is a processor that executes various types of arithmetic processes. The ROM is a non-volatile storage unit in which control programs, such as a BIOS and an OS, for causing the CPU to execute the various types of arithmetic processes are preliminarily stored. The above RAM is a volatile or non-volatile storage unit that stores various types of information and is used as a transient storage memory (work area) of the various types of processes to be executed by the above CPU. Then, the control unit 31, with the above CPU, executes various types of control programs preliminarily stored in the above ROM or storage unit 32, thereby to control the management operation terminal 30.

As shown in FIG. 2, the control unit 31 includes various processing units such as a setting processing unit 311, a display processing unit 312, a creation processing unit 313, a calculation processing unit 314, a determination processing unit 315, and a notification processing unit 316. Also, with the CPU executing various processes that accord to the control program, the control unit 31 functions as the above various processing units. Also, a part or all of the above processing units may include an electronic circuit. Note that the above control program may be a program that causes a plurality of processing units to function as the above processing unit.

Specifically, the setting processing unit 311 sets and registers information on the work vehicle 10 (hereinafter, referred to as work vehicle information), information on the farm field F (hereinafter, referred to as farm field information), and information on the work (here, the spray work) (hereinafter, referred to as work information).

In the setting process of the above work vehicle information; by the farm field manager doing operations to register information at the management operation terminal 30, the setting processing unit 311 sets the above information including the model of the work vehicle 10, the position where the antenna 164 is mounted in the work vehicle 10, the type of the work machine (here, the spray device 14), the size and shape of the work machine, the work machine's position relative to the work vehicle 10, the vehicle speed and engine revolution speed during the working of the work vehicle 10, and the vehicle speed and engine revolution speed during the turning of the work vehicle 10. In the present embodiment, the information on the spray device 14 is set as the information on the work machine.

In the setting process of the farm field information; by the farm field manager by doing the operation to register information at the management operation terminal 30, the setting processing unit 311 sets the above information including the position and shape of the farm field F, the work start position S in which the work is started and the work finish position G in which the work is ended (see FIG. 8), and the work direction. Note that the work direction means a direction in which the work vehicle 10 is caused to travel while doing the spray work with the spray device 14, in the work area as the farm field F's area excluding the non-work area such as a headland.

The information on the position and shape of the farm field F can be automatically acquired by, for example, the farm field manager manually causing the work vehicle 10 to circumferentially travel one time along an outer periphery of the farm field F and recording the transition of then position information of the antenna 164. Also, the position and shape of the farm field F can also be acquired based on a polygon acquired by the farm field manager operating, in a state of displaying a map at the management operation terminal 30, the management operation terminal 30 thereby to designate a plurality of points on the above map. The area specified by the acquired position and shape of the farm field F is an area (travel area) where the work vehicle 10 can be caused to travel.

In the setting process of the above work information, the setting processing unit 311 is so configured as to be able to set, as the work information, the number of skips, which is the number of work routes to be skipped when the work vehicle 10 makes a turn in the headland, the width of the headland, etc.

Based on each of the pieces of various setting information, the setting processing unit 311 generates the target route R which is a route where the work vehicle 10 is caused to do the automatic travel. The target route R is, for example, a route from the work start position S to the work finish position G (see FIG. 8). The target route R shown in FIG. 8 includes the linear work route r1 for spraying the chemical agent to the crop V in the area where the crop V is planted, and the transfer route R2 for allowing a movement between the crop rows Vr without doing the spray work. To the server 20, the setting processing unit 311 outputs the target route R's generated route data in association with the farm field F. The server 20 stores the target route R's route data in association with each farm field F.

The display processing unit 312 executes the process to display various types of information on the operation display unit 33. For example, the display processing unit 312 causes the operation display unit 33 to display a registration screen for registering the work vehicle information, the farm field information, the work information, the work plan, and the like, an operation screen for causing the work vehicle 10 to start the automatic travel, a display screen for displaying the travel state of the work vehicle 10, or the like. The display processing unit 312 is an example of the display processing unit of the present invention.

The following is a description of a specific configuration of the control unit 31 that creates the work plan of the spray work for each farm field.

Figure 9:
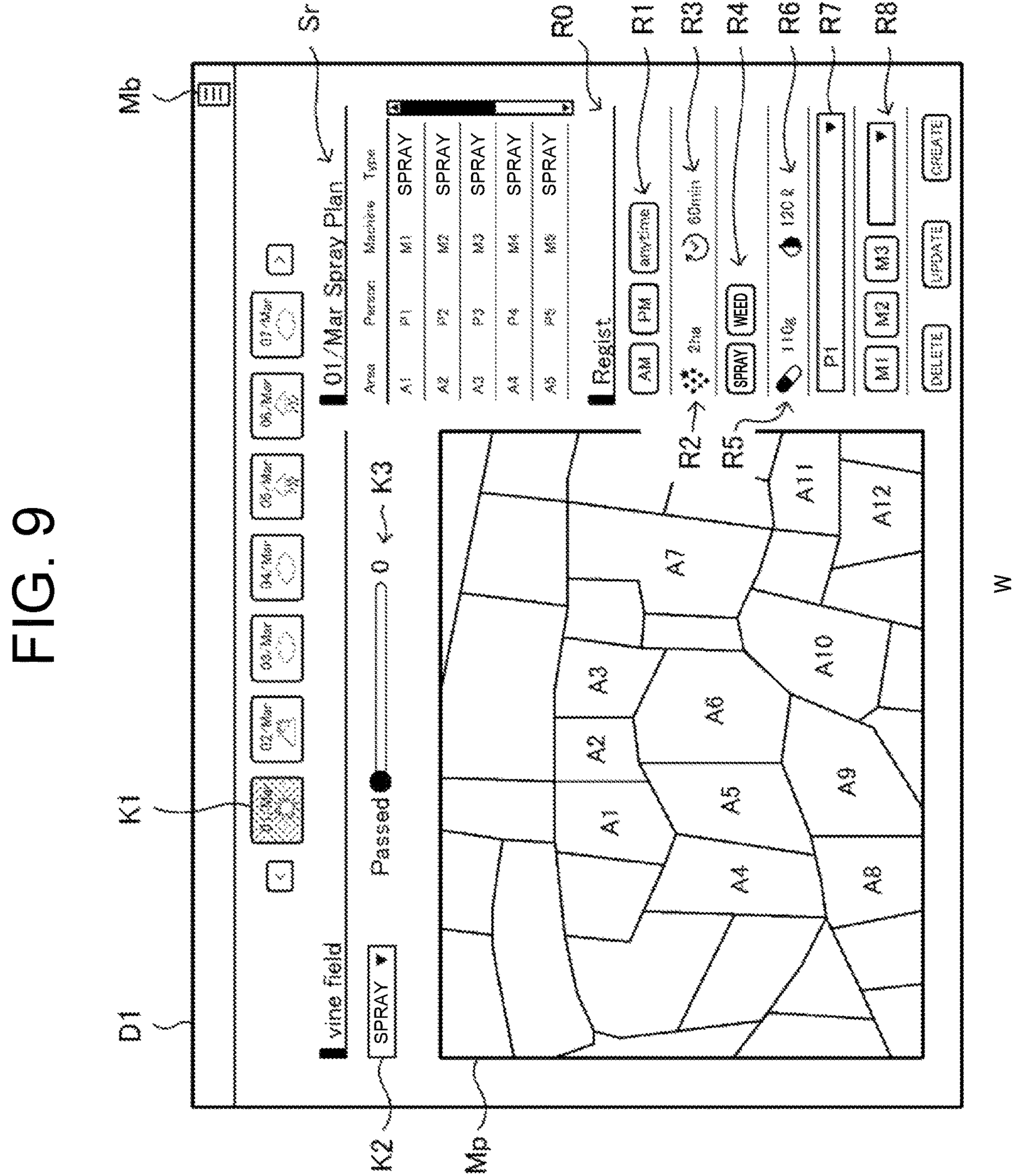
FIG. 9 is a diagram showing an example of a registration screen displayed on a management operation terminal according to the embodiment of the present invention.

FIG. 9 shows an example of a registration screen D1 for registering the work plan. When the farm field manager enters the user ID and password in a login screen (not shown) displayed at the management operation terminal 30, for example, the display processing unit 312 causes the registration screen D1 to be displayed. The registration screen D1 includes a map Mp of a given area including plural farm fields F, a date button K1 to select the scheduled work day, a work type button K2 to select the work type, an elapsed day button K3 to select the number of days elapsed from the previous work day, a registration column R0, a work plan list Sr that lists the registered work plan, and the like.

Also, the registration column R0 includes a work time registration column R1 to register the work time, an area column R2 to display or register the size (area) of the farm field, a work time column R3 to display or register the work time (e.g., spray time), a work type column R4 to register the work type (spraying, weeding, etc.), a chemical agent column R5 to display or register the total amount of chemical agent (chemical liquid), a water content column R6 to display or register total amount of water, a worker column R7 to register the worker, a model column R8 to register the model of the work vehicle 10, and the like.

The creation processing unit 313 creates the work plan for each farm field F. Specifically, the farm field manager selects the date button K1 on the registration screen D1 thereby to determine the scheduled work day. FIG. 9 shows a state of selecting "March 1". Next, the farm field manager, on the map Mp, selects the farm field F for the work plan. For example, the farm field manager selects a farm field A1. The creation processing unit 313 is an example of the creation processing unit of the present invention.

Next, the farm field manager registers each item of the registration column R0. For example, in the work time registration column R1, the farm field manager registers a work time showing whether the work is done in the morning, in the afternoon, or at any time of the day. Here, the display processing unit 312 causes the area column R2 to display the area of the farm field A1. For example, the display processing unit 312 causes the area column R2 to display a pre-registered area or an area calculated from the map Mp. Also, the display processing unit 312 causes the work time column R3 to display the work time (spray time). Specifically, the calculation processing unit 314 calculates the spray time of the spray work based on the target route R of the farm field A1. For example, the calculation processing unit 314 calculates the spray time based on the information such as the area of the farm field A1, the travel speed of the work vehicle 10, the target route R, and the work machine. Also, the calculation processing unit 314 calculates the spray time based on the work history information (see below for details) of the past spray work in the farm field A1. The display processing unit 312 causes the work time column R3 to display the calculated spray time. Also, the farm field manager can change the area displayed in the area column R2, and the spray time displayed in the work time column R3. The calculation processing unit 314 is an example of the calculation processing unit of the present invention.

Also, the farm field manager selects the work type in the work type column R4. Here, the farm field manager selects "Spray".

Also, the display processing unit 312 causes the chemical agent column R5 to display the total amount of chemical agent, and causes the water content column R6 to display the total amount of water. Specifically, the calculation processing unit 314 calculates the total amount of chemical agent and the total amount of water based on the target route R of the farm field A1. The calculation processing unit 314 calculates the total amount of chemical agent and the total amount of water based on the work history information on the past spray work in the farm field A1 (see below for details). The total amount of chemical agent and the total amount of water are each an example of the spray amount of the present invention. The display processing unit 312 causes the chemical agent column R5 to display the calculated total amount of chemical agent and causes the water content column R6 to display the calculated total amount of water. The farm field manager can change the total amount of chemical agent displayed in the chemical agent column R5, and the total amount of water displayed in the water content column R6.

Also, the farm field manager, in the worker column R7, selects the worker to do the spray work in the farm field A1. Here, the farm field manager selects a worker P1. Also, the farm field manager, in the model column R8, selects the model of the work vehicle 10 that does the spray work. Here, the farm field manager selects a model "M1".

Completing the registration operation of each item of the registration column R0, the farm field manager presses down the registration button ("CREATE"). The creation processing unit 313 creates the work plan that includes the work information (information of each of items R1 to R8) related to the spray work to be done on "March 1" in the farm field A1.

The farm field manager then, for example, registers another scheduled work day for the farm field A1 (e.g., "March 8"), or registers a scheduled work day of another farm field F (e.g., farm field A2).

In this way, the creation processing unit 313 creates the work plan for each farm field F according to the registration operation of the farm field manager. Each time creating the work plan for each farm field F, the creation processing unit 313 outputs data of the work plan to the server 20. Also, the information on the target route R may be included in the above work plan.

The server 20 saves and manages the work plan of each farm field F. Also, the server 20 causes the registration screen D1 of the management operation terminal 30 to display the work plan of each farm field F. Specifically, the display processing unit 312 causes the work plan list Sr (see FIG. 9) to display the information which is managed by the server 20 and which is on the work plan of each farm field F.

The registration screen D1 (see FIG. 9) has, in addition to the function of registering the work plan, the function of displaying the registered work plan. Therefore, the farm field manager and each farm field F's worker view the registration screen D1, thereby making it possible to check the work plan of each farm field F for each date.

In addition, the registration screen D1 is further provided with a function that, when a work plan that needs to be alerted to do the work as planned in the work plan (notification function) is present in the plural work plans, causes work information (notification information) on the above work plan to be notified. The specific configuration of the above notification function is described below.

The determination processing unit 315 acquires one or more work plans. Also, the determination processing unit 315 determines whether a work plan that needs to be alerted for the work vehicle 10 to do the work as planned in the work plan (first work plan of the present invention) is present or not in the plural work plans.

When the work plan that needs to prompt the attention is present in the plural work plans, the notification processing unit 316 causes the work information (notification information) on the work plan to be notified.

Figure 10:
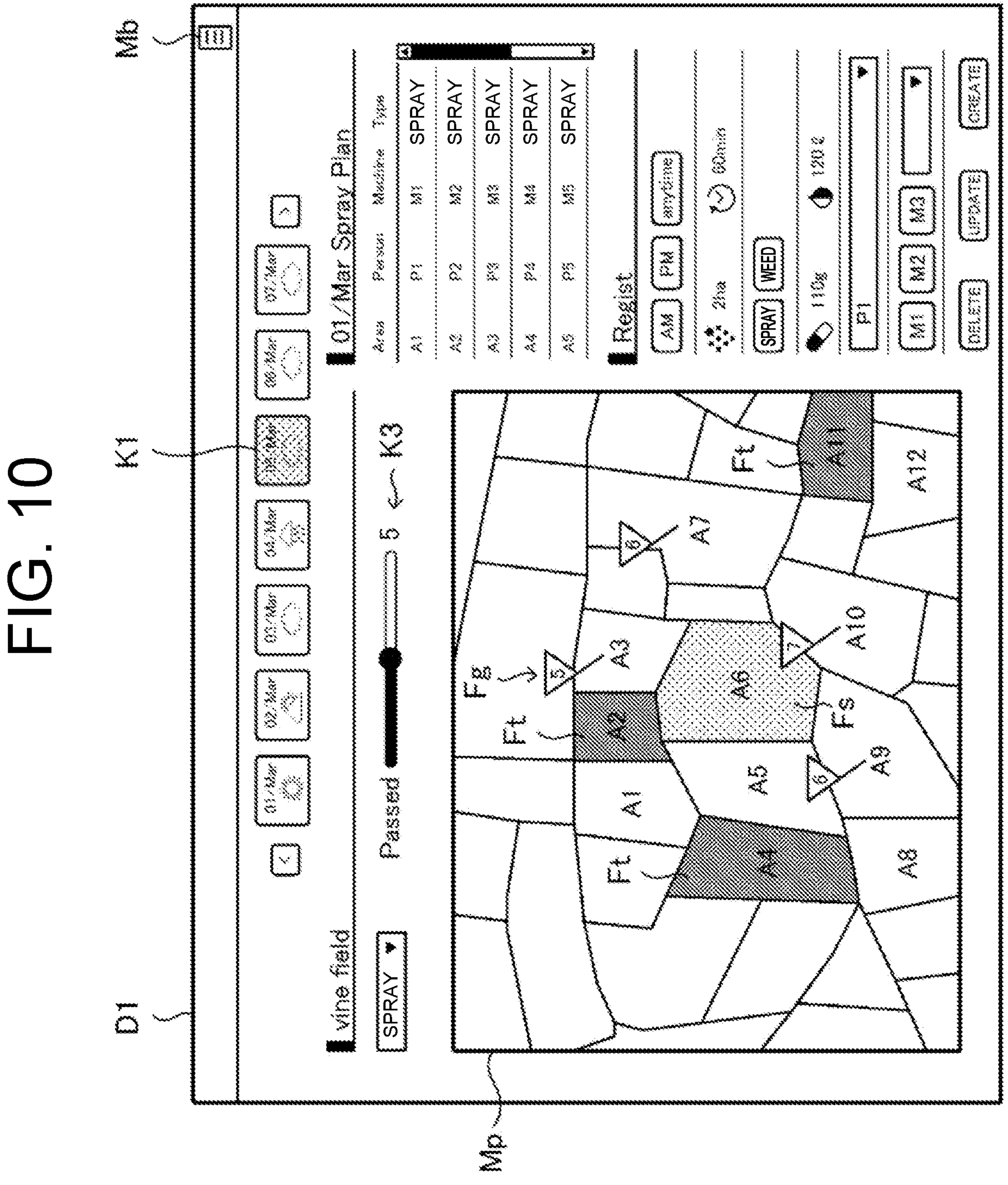
FIG. 10 is a diagram showing an example of the registration screen displayed at the management operation terminal according to the embodiment of the present invention.

FIG. 10 shows an example of the registration screen D1. In the example shown in FIG. 10, "March 5" is selected by the farm field manager, displaying the work status as of "March 5" on the map Mp of the registration screen D1. Specifically, the determination processing unit 315 determines whether or not the work plan in which the work has not been finished as of the current time point ("March 5" in FIG. 10) is present in the plural work plans. For example, the server 20, from the work vehicle 10 and the mobile operation terminal 40, acquires the information on the work status of each farm field F, and manages the work's start, interruption, end, etc. which correspond to the work plan. Also, for each farm field F, the server 20 stores the work history information (see FIG. 13) which corresponds to the work plan. The above work history information includes the work day, the work time, the spray amount, the type of chemical agent, the worker, the model of the work vehicle 10, and the position information.

The determination processing unit 315 refers to the above work history information thereby to acquire one or more work plans, for example, and determines whether or not the work plan in which the scheduled work day prior to "March 5" has been registered and for which the above work has not been finished is present as of "March 5". For example, when the worker fails to accomplish the work on the scheduled work day, or has forgot to do the work, information showing that the work has not been finished is registered in the above work history information. By referring to the above work history information, the determination processing unit 315 determines, for each work plan, whether or not the work is being done as planned in the work plan. The determination processing unit 315 is an example of each of the acquisition processing unit and determination processing unit of the present invention.

When the work plan that has not been finished is present as of the current time point ("March 5" in FIG. 10) in the plural work plans, the notification processing unit 316 causes the work information for the work plan to be notified. Specifically, the notification processing unit 316 causes the farm field F, which corresponds to the above work plan, to be identifiably displayed on the map Mp of the registration screen D1 shown in FIG. 10. For example, when, for a farm field A6, the work plan has been registered with "March 3" as the scheduled work day of the spray work, and the spray work in the farm field A6 has not been finished as of the current time point ("March 5"), the notification processing unit 316, by causing a background image Fs of the farm field A6 to be highlighted, causes the farm field A6 (an example of a first work site of the present invention) to be identifiably displayed, as shown in FIG. 10. As another embodiment, the notification processing unit 316 may cause the farm field A6 to display a flag. This allows the farm field manager and the worker to know the farm field F for which the work has not been done on the scheduled work day, the farm field F in which the work has not been finished on the scheduled work day, etc. Then, the farm field manager can, for the farm field A6, register again the work plan on the spray work, and the worker can, for the farm field A6, do the spray work on the relevant day, for example. The notification processing unit 316 is an example of the notification processing unit of the present invention.

The notification processing unit 316 may display, in different display mode from each other, the farm field F where the scheduled work day has elapsed and the work has not been done at all, and the farm field F where the work has been interrupted in the middle of the work, so that the above farm fields F can be distinguished on the map Mp of the registration screen D1. This allows the farm field manager and the worker to identify and know the farm field F where the work has not been done at all, and the farm field F where the work has been interrupted. Also, the notification processing unit 316 may also cause the farm field F, for which the work plan of the current day or later has been registered, to be so displayed, on the map Mp of the registration screen D1, as to be identifiable from any other farm field F.

As another embodiment, the notification processing unit 316 may cause the number of days, which elapsed from the scheduled work day to the current day, to be so displayed as to correspond to the farm field F. In the example in FIG. 10, the notification processing unit 316 causes the number of days, which elapsed from "March 3" to "March 5", that is, "2 days", to be so displayed as to correspond to the farm field A6.

This allows the farm field manager and the worker to know the number of days elapsed from the scheduled work day to the current day.

Here, in the example shown in FIG. 10, the farm field manager has set, to "5 days", the elapsed day button K3 which selects the number of days elapsed from the previous work day. Specifically, in the farm fields A1 to A12, for example, the farm field manager sets the elapsed day button K3 to "5 days", so as to check (extract), as of the current day ("March 5"), the farm field where 5 days or more have elapsed from the day on which the previous spray work was done.

The determination processing unit 315 determines whether or not the work plan in which the given number of days or more have elapsed from the work day, on which the previous work was done, to the current day is present in the plural work plans. For example, the determination processing unit 315 refers to the work history information thereby to determine whether or not the work plan in which "5 days" or more have elapsed from the work day of the previous spray work is present as of "March 5".

When the work plan in which the given number of days ("5 days" in FIG. 10) or more have elapsed from the work day, on which the previous work was done, to the current day is present in the plural work plans, the notification processing unit 316 causes the number of days elapsed from the work day, on which the previous work was done, to the current day to be so displayed, on the map Mp of the registration screen D1 shown in FIG. 10, as to correspond to the farm field F. For the farm field A3, for example; when 5 days have elapsed from the work day of the previous spray work, the notification processing unit 316 causes a day count flag Fg, which shows that 5 days have elapsed, to be displayed in association with the farm field A3. The example shown in FIG. 10, for the farm field A7 and farm field A9, shows that 6 days have elapsed from the work day of the previous spray work, and for the farm field A10, shows that 7 days have elapsed from the work day of the previous spray work. This allows the farm field manager and the worker to know the farm field F that needs to promptly do the next spray work. Then, for the above farm field F, the farm field manager, for example, can register the work plan on the next spray work.

As another embodiment, the notification processing unit 316, when the work plan in which the work content is work repeatedly done in a given cycle and the scheduled work day is not registered in the given cycle is present, may cause the farm field F, which corresponds to the above work plan, to be identifiably displayed.

Specifically, the determination processing unit 315 determines whether or not the work plan in which the work content is the spray work repeatedly done in the given cycle (e.g., one or two weeks) and the scheduled work day is not registered in the given cycle is present in the plural work plans. For example, the determination processing unit 315 refers to the work plan which is stored on the server 20 and which is for each farm field F, thereby to execute the above determination process.

When the work plan in which the work content is the spray work repeatedly done in the given cycle and the scheduled work day is not registered in the given cycle is present in the plural work plans, the notification processing unit 316 causes the farm field F, which corresponds to the above work plan, to be identifiably displayed on the map Mp of the registration screen D1. For example, when the spray work needs to be weekly done in a farm field A8, and the spray work is done one week before the current day "March 5" and the work plan of the spray work has not been registered for the current day, the notification processing unit 316 causes the farm field A8 to be identifiably displayed on the map Mp. Also, the notification processing unit 316 may cause information, which prompts the registration of the work plan for the farm field A8, to be displayed. This allows the farm field manager and the worker to know that the work plan of the spray work on the farm field A8 has not been registered.

By the way, some of the work done by the work vehicle 10 are easily affected by a weather condition. For example, in the spray work, a rainfall occurring after the chemical agent being sprayed to the crop V washes away the chemical agent, reducing the effect of the chemical agent on the crop V. Due to this, immediately after the rainfall, for example, it is necessary to spray the chemical agent. Then, as another embodiment, the notification processing unit 316 may make a notification of weather-specific notification information.

Specifically, the determination processing unit 315 determines whether or not a work plan in which the weather forecast for the scheduled work day is expected to be rainy is present in the plural work plans. By a well-known method, the determination processing unit 315 acquires the information on the weather forecast for a given area including the farm field F. Also, the display processing unit 312 may cause the weather forecast information to be displayed on the date button K1 of the registration screen D1 (see FIG. 9 and FIG. 10).

When the work plan in which the weather forecast for the scheduled work day is expected to be rainy is present in the plural work plans, the notification processing unit 316 causes the work information for the above work plan to be notified. Specifically, when the work plan in which the weather forecast for the scheduled work day is expected to be rainy is present in the plural work plans, and when the scheduled work day of the given work content that needs to be done after the rain has not been registered, the notification processing unit 316 causes the farm field F, which corresponds to the above work plan, to be identifiably displayed on the map Mp of the registration screen D1. In the farm field A12, for example, when, in the case of rainfall immediately after the spray work being done on "March 4", the work plan of the spray work is not registered on the next day, March 5, the notification processing unit 316 causes the farm field A12 to be identifiably displayed on the registration screen D1 of "March 5". The notification processing unit 316 may cause the information, which prompts the registration of the work plan of the spray work for the farm field A12, to be displayed. This allows the farm field manager and the worker to know that the spray work on the farm field A12 is required.

Also, some of the work done by the work vehicle 10 have work that prohibits entry for a given period after the work is finished. For example, in the spray work, entry to the farm field F is prohibited for 24 to 48 hours after the chemical agent is sprayed to the crop V. Therefore, as another embodiment, the notification processing unit 316 may notify the information on an entry-prohibited area.

Specifically, the determination processing unit 315 determines whether or not the work plan in which the work content is the work that prohibits entry to the farm field F for the given period after the work vehicle 10 has done the work is present in the plural work plans.

When the work plan in which the work content is the work for which entry to the farm field F is prohibited for the given period after the work vehicle 10 has done the work is present in the plural work plans, the notification processing unit 316 causes the state, in which the farm field F that corresponds to the above work plan prohibits entry for the given period, to be identifiably displayed on the map Mp of the registration screen D1. When 48 hours have not elapsed, as of the current time point, from the doing of the spray work for the farm fields A2, A4, and A11, for example, the notification processing unit 316, by causing a background image Ft of each of the farm fields A2, A4, and A11 to be highlighted, causes each farm field to be identifiably displayed. Further, the determination processing unit 315 may set the entry-prohibited period based on the type of chemical agent. Also, the notification processing unit 316 may display the time elapsed from enforcing of the entry prohibition, the remaining time until cancelling of the entry prohibition, etc., and may change the background image Ft according to the above elapsed time or the above remaining time.

As described above, the notification processing unit 316 causes the work information, which is on the work plan (the first work plan of the present invention) that needs to be alerted for the work vehicle 10 to do the work according to the work plan, to be displayed on the map Mp of the registration screen D1 (FIG. 10).

Figure 11:
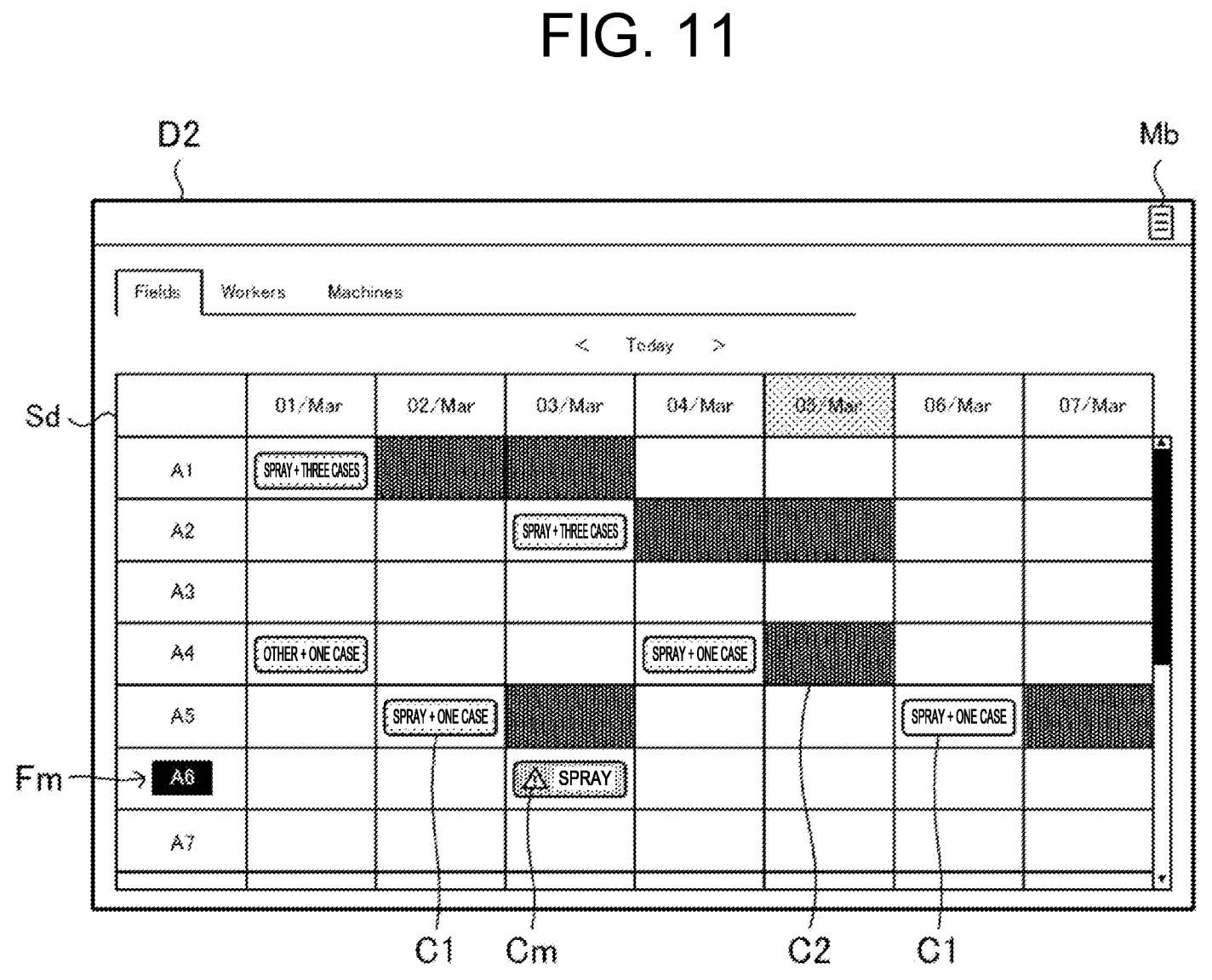

As another embodiment, the notification processing unit 316 may cause the above work information to be displayed on a schedule table Sd on a schedule screen D2 displayed at the management operation terminal 30. FIG. 11 shows an example of the schedule screen D2. When the farm field manager presses down a menu button Mb thereby to select "Schedule" on the registration screen D1 shown in FIG. 10, for example, the display processing unit 312 causes the management operation terminal 30 to display the schedule screen D2. The schedule screen D2 displays the work plan of each farm field F, the work plan of each worker, and the work plan of each model of the work vehicle 10. FIG. 11 shows an example of the work plan of each farm field F.

The display processing unit 312 causes the information, which is managed by the server 20 and which is on the work plan of each farm field F, to be listed on the schedule table Sd. Specifically, the display processing unit 312 causes an icon C1, which corresponds to the work plan, to be displayed in a date column of the scheduled work day on the schedule table Sd. Also, the notification processing unit 316 causes the work information (notification information), which is on the work plan (the first work plan of the present invention) that needs prompt attention for the work vehicle 10 to do the work according to the plan of the work plan, to be displayed on the schedule table Sd.

For example, when the work plan that has not been finished as of the current time point ("March 5" in FIG. 10) is present in the plural work plans, the notification processing unit 316 causes the farm field F, which corresponds to the above work plan, to be identifiably displayed on the schedule table Sd shown in FIG. 11. For example, when, for the farm field A6, the work plan with "March 3" as the scheduled work day of the spray work is registered, the notification processing unit 316, as shown in FIG. 11, causes warning information Cm to be displayed in the date column of "March 3" of the farm field A6, and causes the background image of the above date column to be highlighted. Also, the notification processing unit 316 causes a background image Fm of the name of the farm field A6 of the schedule table Sd to be highlighted.

Also, when the work plan in which the given number of days ("5 days" in FIG. 10) or more have elapsed from the work day, on which the previous work was done, to the current day is present in the plural work plans, the notification processing unit 316 may cause the number of days elapsed from the previous work day to the current day to be so displayed, on the schedule table Sd of the schedule screen D2 shown in FIG. 11, as to correspond to the farm field (not shown).

When the work plan in which the work content is the spray work repeatedly done in the given cycle and the scheduled work day is not registered in the given cycle is present in the plural work plans, the notification processing unit 316 may cause the farm field F, which corresponds to the above work plan, to be identifiably displayed on the schedule table Sd of the schedule screen D2 (not shown).

When the work plan in which the weather forecast for the scheduled work day is expected to be rainy is present in the plural work plans, and the scheduled work day of the given work content that needs to be done after the rain is not registered, the notification processing unit 316 may cause the farm field F, which corresponds to the above work plan, to be identifiably displayed on the schedule table Sd of the schedule screen D2 (not shown).

Also, when the work plan in which the work content is the work that prohibits entry to the farm field F for the given period after the work vehicle 10 has done the work is present in the plural work plans, the notification processing unit 316 may cause the state, in which the farm field F that corresponds to the work plan prohibits entry for the given time, to be identifiably displayed on the schedule table Sd of the schedule screen D2. When, for the farm fields A2 and A4, 48 hours have not elapsed from the doing of the spray work, for example, the notification processing unit 316, by causing a background image C2 of each of the farm fields A2 and A4 to be highlighted, causes each farm field to be identifiably displayed on the schedule table Sd of the schedule screen D2. The notification processing unit 316 may display the entry-prohibited period in the past date, as in the farm field A1 and the farm field A5, or may display the entry-prohibited period on the current day or later (in the future), as in the farm field A5.

As another embodiment, the notification processing unit 316 may cause the icon C1, which corresponds to the farm field F (farm field A5 in FIG. 11) for which the work plan of the current day or later is registered, to be so displayed, on the schedule table Sd of the schedule screen D2, as to be identifiable from the icon C1 of any other farm field F.

As described above, the notification processing unit 316 causes the work information on the work plan (the first work plan of the present invention) that needs prompt attention for the work vehicle 10 to do the work as planned in the work plan to be notified on the schedule table Sd of the schedule screen D2 (FIG. 11). As described above, the notification processing unit 316 of the present embodiment causes the above information to be notified on at least any of the map Mp (see FIG. 10) and the schedule table Sd (see FIG. 11).

This makes it possible for the farm field manager and the worker to know the work plan that needs to be alerted for the work vehicle 10 to do the work as planned in the work plan, and that work that is not progressing as planned in the work plan.

Figure 12:
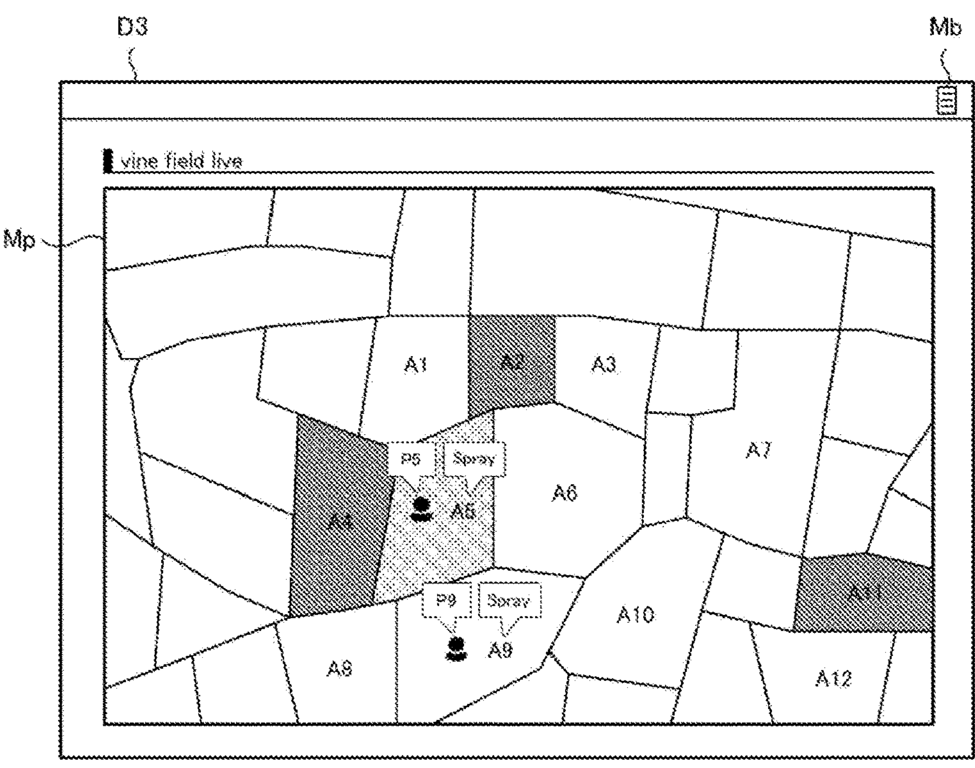
FIG. 12 is a diagram showing an example of a work status screen displayed at the management operation terminal according to the embodiment of the present invention.

FIG. 12 shows an example of a work status screen D3 which shows the current work status. On the registration screen D1 (see FIG. 9 and FIG. 10) or the schedule screen D2 (see FIG. 11), for example; when the farm field manager presses down the menu button Mb thereby to select "Work Status", the display processing unit 312 causes the management operation terminal 30 to display the work status screen D3. The work status screen D3 displays the current work status for each farm field F. For example, on the map Mp, the display processing unit 312 causes the information on the work content (spray work) and worker to be displayed in the farm fields A5 and A9 currently under work. Also, the display processing unit 312 may cause the farm field F that is scheduled for the work today, the farm field F that is not scheduled for the work today, the farm field F that is under the work by another worker, etc. to be identifiably displayed. This allows the farm field manager and the worker to know in real time the work status of each farm field F.

Figure 13:
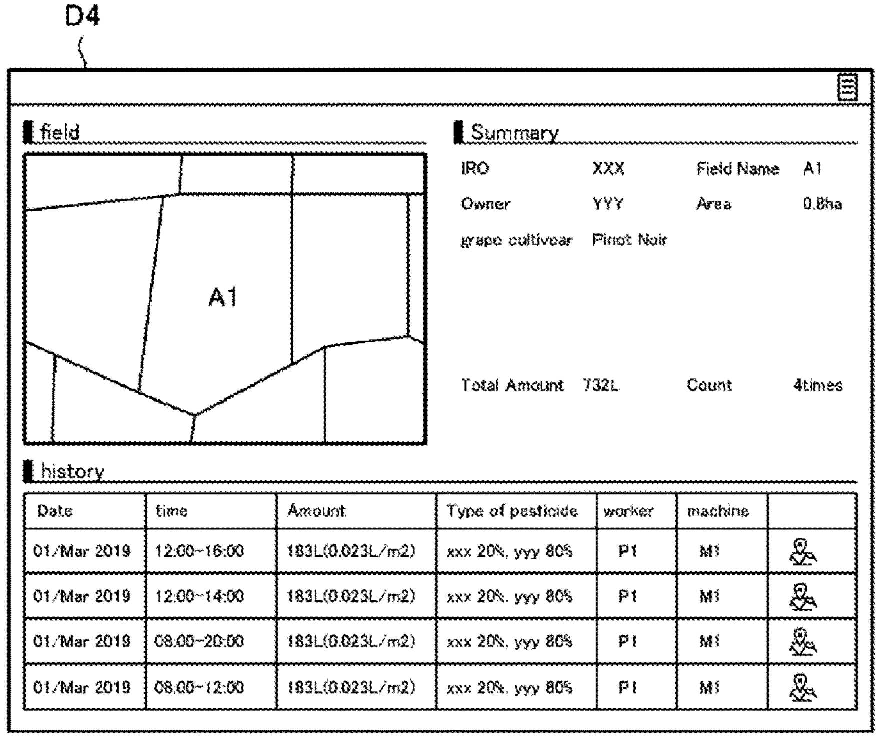
FIG. 13 is a diagram showing an example of a work history screen displayed at the management operation terminal according to the embodiment of the present invention.

FIG. 13 shows an example of a work history screen D4 which shows the work history information. On the registration screen D1 (see FIG. 9 and FIG. 10) or the schedule screen D2 (see FIG. 11), for example; when the farm field manager presses down the menu button Mb thereby to select "Work History", the display processing unit 312 causes the management operation terminal 30 to display the work history screen D4. The work history screen D4 displays the work history information for each farm field F. Specifically, the work history screen D4 displays the work history information including the work time for each work day, the spray amount, the type of chemical agent, the worker, the model of the work vehicle 10, and the position information. For example, the server 20 acquires, from the work vehicle 10 and the mobile operation terminal 40, the information on the work status of each farm field F, and stores the work history information which corresponds to the work plan. The display processing unit 312 refers to the work history information of the server 20, and causes the management operation terminal 30 to display the work history information on. Work performance information (work day, work time, spray amount, type of chemical agent, etc.) included in the above work history information is submitted to a given management agency.

Here, the above work history information may be used for creating the work plan. Specifically, the calculation processing unit 314 calculates the total amount of chemical agent and the total amount of water as well as the spray time based on the work history information on the past spray work in the farm field F. For example, when the farm field manager selects the farm field A1 on the registration screen D1 shown in FIG. 9, the calculation processing unit 314, based on the work history information on the past spray work in the farm field A1, calculates the spray amount (total amount of chemical agent and total amount of water), which corresponds to the farm field A1, as well as the spray time. The display processing unit 312 causes the calculated spray amount (total amount of chemical agent and total amount of water) to be displayed in the chemical agent column R5 and water content column R6 on the registration screen D1, and causes the calculated spray time to be displayed in the work time column R3 on the registration screen D1.

Also, the display processing unit 312 may cause the management operation terminal 30 to display recipe information which corresponds to each of the plural chemical agents having used for the past spray work in the farm field A1. The recipe information is information that shows a combination of plural chemical agents.

Figure 14:
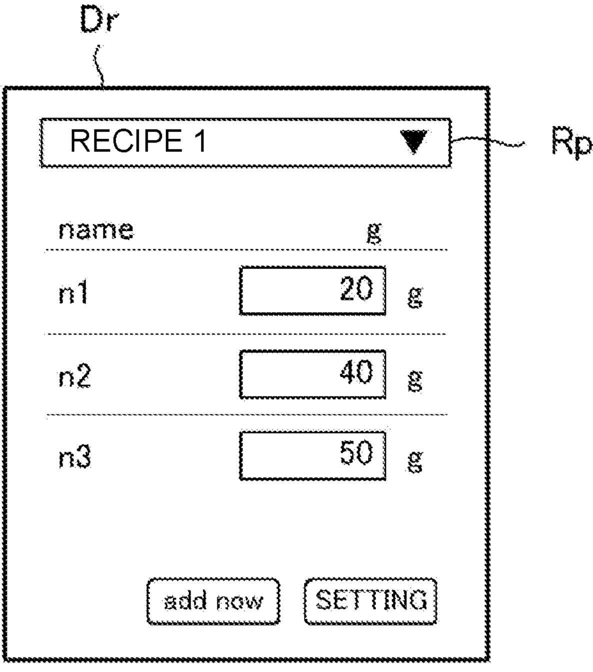
FIG. 14 is a diagram showing an example of a recipe information screen displayed at the management operation terminal according to the embodiment of the present invention.

FIG. 14 shows an example of a recipe information screen Dr. On the registration screen D1 shown in FIG. 9, when the farm field manager selects the icon of the chemical agent column R5, for example, the display processing unit 312 causes the recipe information screen Dr to be displayed. The recipe information screen Dr displays the information on the chemical agent included in the work history information (see FIG. 13). For example, FIG. 14 shows "Recipe 1" including the chemical agents "n1", "n2", and "n3" used for past spray work in the farm field A1. Also, the use amount is displayed for each chemical agent. The use amount may be the use amount per unit area or the total amount actually used. When plural pieces of recipe information are in association with the farm field A1, the farm field manager presses down the recipe selection column Rp thereby to display any other recipe information, making it possible to select a desired recipe.

The control unit 31 registers the recipe information based on the work history information on the past spray work in the farm field F. For example, when, with the spray work done in each farm field F, the server 20 acquires the work performance information from the work vehicle 10 and the mobile operation terminal 40 and stores the work history information, the control unit 31 registers the recipe information for each farm field F or each spray work based on the above work history information. In this way, one or more pieces of recipe information are associated and registered for each farm field F.

Also, the farm field manager can create a new recipe on the recipe information screen Dr. For example, the farm field manager presses down an addition button on the recipe information screen Dr thereby to register the chemical agent and the use amount, and presses down a setting button, thereby to make it possible to create the new recipe. The recipe information for the recipe selected by the farm field manager is stored in association with the farm field F.

From among plural pieces of recipe information, the creation processing unit 313 accepts an operation to select the recipe information (a first recipe information of the present invention) to be used for the spray work in the farm field F, and creates the work plan based on the accepted recipe information. Specifically, when a given recipe is selected on the recipe information screen Dr, the calculation processing unit 314 calculates the total amount of chemical agent and the total amount of water based on the farm field F's target route R and the above recipe information, and the creation processing unit 313 creates the work plan that includes the information on the calculated amount of to-be-sprayed chemical agent and water.

In this way, the control unit 31 causes the spray amount and the spray time which are calculated based on the work history information on the past spray work in the farm field F and which correspond to the farm field F, thereby to create the work plan of the spray work which corresponds to the farm field F. This allows the farm field manager to know in advance the spray amount and spray time, making it possible to create the work plan. Thus, it makes possible to create a proper work plan which corresponds to the farm field F for doing the spray. Also, the spray work can be done as planned in the created work plan. Also, it is possible to prevent any improper chemical agent from being sprayed to the farm field F.

Also, the control unit 31 causes the registered recipe information to be selectably displayed on the registration screen D1, and, based on the selected recipe information, determines the chemical agent and the spray amount which are used for the spray work in the farm field F thereby to create the work plan. With this, the farm field manager, by a simple operation of selecting the past recipe information, can create the work plan proper for the farm field F.

By the way, the work vehicle 10 one in number, as the case may be, continuously does the spray work in plural farm fields F on the same day. In this case, if the total spray amount of chemical agent required in plural farm fields F can be known at the time of creating the work plan, the above total amount of chemical agent can be stored in the storage tank 14A before starting the work, or the required refill amount of chemical agent can be properly refilled during the course of the work.

Then, as another embodiment; when creating the work plan for the plural farm fields F, the display processing unit 312 may cause the total spray amount, which is required for collectively doing the spray work in the plural farm fields F on the scheduled work day, to be display on the registration screen D1. For example, when creating the work plan of the spray work with "March 1" as the scheduled work day for the farm fields A1 and A2, the display processing unit 312 causes the total spray amount, which is the spray amount (total amount of chemical agent and water) required for the farm field A1 and the spray amount (total amount of chemical agent and water) required for the farm field A2, to be displayed on the registration screen D1.

Also, the creation processing unit 313 creates a work plan that collects the spray work for each of the farm fields A1 and A2. For example, when the farm field manager selects each of the farm fields A1 and A2 on the map Mp of the registration screen D1, the creation processing unit 313 creates the single work plan that collects the spray work for each of the farm fields A1 and A2. The control unit 31 executes the above process on the condition that the chemical agents used in the farm fields A1 and A2 are the same. With this; before starting the spray work in each of the farm fields A1 and A2, the worker can store, in the storage tank 14A, the total spray amount of chemical agent required in the farm fields A1 and A2. Also, the worker stores, in the storage tank 14A, the spray amount of chemical agent required in the farm field A1 thereby to make it possible to do the spray work in the farm field A1, and then refill the spray amount of chemical agent required in the farm field A2 thereby to make it possible to do the spray work in the farm field A2.

Thus, the control unit 31 calculates the spray amount and spray time of the chemical agent based on the target route R of the work vehicle 10 that does the spray work in the farm field F, and causes the management operation terminal 30 to display the calculated spray amount and spray time (see FIG. 9, etc.). Also, based on the spray amount and the spray time, the control unit 31 creates the work plan of the spray work which corresponds to the farm field F.

In addition to each of the above processes, the control unit 31 executes the following processes. Specifically, from the worker, the control unit 31 accepts the work start operation for causing the work vehicle 10 to start the work, the travel stop operation for causing the work vehicle 10 to stop traveling during the automatic travel, etc. When accepting each of the above operations, the control unit 31 outputs, via the server 20 to the work vehicle 10, an instruction that accords to each of the operations.

When acquiring the work start instruction from the management operation terminal 30, the vehicle control device 11 of the work vehicle 10 starts the automatic travel of and the work (for example, spray work) of the work vehicle 10. Also, when acquiring the travel stop instruction from the management operation terminal 30, the vehicle control device 11 stops the automatic travel of and the work of the work vehicle 10.

Note that the management operation terminal 30 may be able to access, via the communication network N1, a website (agricultural support site) of an agricultural support service provided by the server 20. In this case, the management operation terminal 30, with the control unit 31 executing a browser program, may function as a terminal for operating the server 20.

[Server 20]

As shown in FIG. 2, the server 20 is a server device including a control unit 21, a storage unit 22, an operation display unit 23, a communication unit 24, and the like. Also, the server 20 is not limited to a single computer, but may also be a computer system in which plural computers work together. Also, the various types of processes executed by the server 20 may be distributed and executed by one or more processors. The server 20 saves and manages each farm field F's work plan created at the management operation terminal 30. Also, the server 20 saves and manages each farm field F's target route R created at the management operation terminal 30. Also, the server 20 acquires, from the work vehicle 10 and the mobile operation terminal 40, the work information (work performance) on the work status of each farm field F, and saves and manages the work information as the work history information which corresponds to the work plan.

The communication unit 24 is a communication interface for connecting the server 20 to the communication network N1 by wire or wirelessly and for executing, via the communication network N1, a data communication, which accords to a given communication protocol, with external devices such as one or more work vehicle 10, the management operation terminal 30, the mobile operation terminal 40, etc.

The operation display unit 23 is a user interface that includes a display unit, such as a liquid crystal display or an organic EL display, that displays various types of information, and an operation unit, such as a touch screen, mouse, or keyboard, that accepts an operation.

The storage unit 22 is a non-volatile storage unit, such as an HDD or an SSD, that stores various types of information. The storage unit 22 stores a control program for causing the control unit 21 to execute a given control process. For example, the control program is non-transiently recorded in a computer-readable recording medium such as a CD or a DVD, and is read by a given reading device (not shown) and thereby is stored in the storage unit 22. Also, the above control program may be downloaded from another server (not shown) via the communication network N1 to the server 20 and stored in the storage unit 22.

The control unit 21 has control devices such as a CPU, a ROM, and a RAM. The CPU is a processor that executes various types of arithmetic processes. The ROM is a non-volatile storage unit in which control programs, such as a BIOS and an OS, for causing the CPU to execute the various types of arithmetic processes are preliminarily stored. The above RAM is a volatile or non-volatile storage unit that stores various types of information and is used as a transient storage memory (work area) of the various types of processes to be executed by the above CPU. Then, the control unit 21, with the above CPU, executes various types of control programs preliminarily stored in the above ROM or storage unit 22, thereby to control the server 20.

Specifically, the control unit 21 acquires various types of information from the work vehicle 10, the management operation terminal 30, and the mobile operation terminal 40. For example, from the management operation terminal 30, the control unit 21 acquires the information on the target route R and the work plan that correspond to each farm field F. When acquiring the target route R and the work plan, the control unit 21 stores, in the storage unit 22, the target route R and the work plan in association with the farm field F. Also, from the work vehicle 10 and the mobile operation terminal 40, the control unit 21 acquires the information such as the work performance. When acquiring the work performance, the control unit 21 stores, in the storage unit 22, the work performance as the work history information. The above work history information includes the date and time of work, the spray amount, the type of chemical agent, the worker, the model of the work vehicle 10, and the position information.

Also, the above work history information is displayed at the management operation terminal 30 according to the operation of the farm field manager at the management operation terminal 30 (see FIG. 13). According to a request from the management operation terminal 30, the control unit 21 may execute a process to cause the management operation terminal 30 to display the work history information.

Also, the control unit 21 transfers the route data of the target route R (see FIG. 8) to the work vehicle 10. In the storage unit 12, the work vehicle 10 stores the target route R's route data transferred from the server 20. While measuring the work vehicle 10's current position with the positioning device 16, the work vehicle 10 does the automatic travel following the target route R.

Here, the work vehicle 10 is so configured as to be able to do the automatic travel when the current position is in the farm field F, and is so configured as to be unable to do the automatic travel when the current position is outside the farm field F (such as on a public road). Also, the work vehicle 10 is so configured as to be able to do the automatic travel when, for example, the current position matches the work start position S.

When the current position matches the work start position S; with a remote controller (not shown)'s start button pressed by the operator thereby to give the work start instruction, the work vehicle 10, with the vehicle control device 11, starts the automatic travel thereby to start the spray work by the spray device 14.

That is, the work vehicle 10 allows for the automatic travel on the condition that the current position matches the work start position S. Note that the condition for allowing for the automatic travel of the work vehicle 10 is not limited to the above condition.

Based on the target route R acquired from the server 20, the vehicle control device 11 causes the work vehicle 10 to do the automatic travel from the work start position S to the work finish position G. Also, with the work vehicle 10 finishing the work, the vehicle control device 11 may cause the work vehicle 10 to do the automatic travel from the work finish position G to an entrance of the farm field F. When the work vehicle 10 is doing the automatic travel, the mobile operation terminal 40, by receiving the state (position, travel speed, work status, etc.) of the work vehicle 10, can cause the operation display unit 43 to display the state of the work vehicle 10.

[Mobile Operation Terminal 40]

As shown in FIG. 2, the mobile operation terminal 40 is an information processing device that includes a control unit 41, a storage unit 42, an operation display unit 43, a communication unit 44, etc. The mobile operation terminal 40 is, for example, a smartphone or tablet terminal. The mobile operation terminal 40 is operated, for example, by the worker working in the farm field F. The worker operates the mobile operation terminal 40 thereby to check the information (work plan, work status, etc.) on the work and to input the work performance. Also, the worker operates the mobile operation terminal 40 thereby to create the work plan and modify the created work plans, as necessary. The mobile operation terminal 40 is an example of the operation terminal of the present invention.

The communication unit 44 is a communication interface for connecting the mobile operation terminal 40 to the communication network N1 by wire or wirelessly, and for executing, via the communication network N1, a data communication, which accords to a given communication protocol, with external devices such as the server 20.

The operation display unit 43 is a user interface that includes a display unit, such as a liquid crystal display or an organic EL display that displays various types of information, and an operation unit, such as a touch screen, a mouse, or a keyboard, that accepts an operation.

The storage unit 42 is a non-volatile storage, such as an HDD or an SSD, that stores various types of information. The storage unit 42 stores a control program for causing the control unit 41 to execute a control process. For example, the control program is non-transiently recorded in a computer-readable recording medium such as a CD or a DVD, and is read by a given reading device (not shown) and thereby is stored in the storage unit 42. Note that the control program may be downloaded from another server (not shown) via the communication network N1 to the mobile operation terminal 40 and thereby may be stored in the storage unit 42.

The control unit 41 has control devices such as a CPU, a ROM, and a RAM. The CPU is a processor that executes various types of arithmetic processes. The ROM is a non-volatile storage unit in which control programs, such as a BIOS and an OS, for causing the CPU to execute the various types of arithmetic processes are preliminarily stored. The above RAM is a volatile or non-volatile storage unit that stores various types of information and is used as a transient storage memory (work area) of the various types of processes to be executed by the above CPU. Then, the control unit 41, with the above CPU, executes various types of control programs preliminarily stored in the above ROM or storage unit 42, thereby to control the server 20.

Specifically, the control unit 41 acquires various types of information from the server 20. For example, from the server 20, the control unit 41 acquires the information on the work plan which corresponds to the farm field F. When acquiring the work plan, the control unit 41 causes the mobile operation terminal 40 to display the work information screen D11. For example, when the worker possessing the mobile operation terminal 40 enters the user ID and password on the login screen displayed at the mobile operation terminal 40, the control unit 41 causes the work information screen D11 to be displayed.

Figure 15:
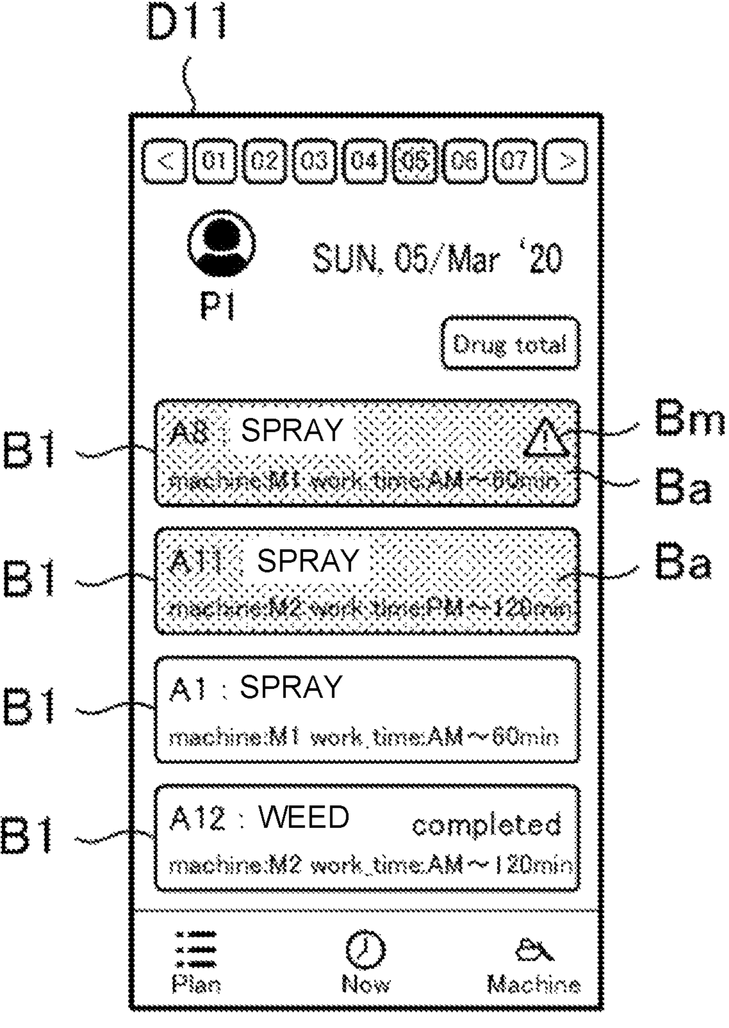
FIG. 15 is a diagram showing an example of a work information screen displayed on a mobile operation terminal according to the embodiment of the present invention.

FIG. 15 shows an example of the work information screen D11. For example, the work information screen D11 shown in FIG. 15 displays a work information icon B1 showing the work plans that respectively correspond the plural farm fields F (farm fields A8, A11, A1, A12) where the worker P1 works. Also, warning information Bm is displayed on the work information icon B1 which corresponds to the farm field A8. Also, background images Ba of the work information icons B1 that correspond to the farm field A8 and the farm field A11 Ba are highlighted. For example, when it is necessary to make an alert so as to do the work in the farm field A8 and farm field A11 as planned in the work plan, the control unit 41 causes the warning information Bm to be displayed or causes the background image Ba to be highlighted. Specifically, when the work has not been accomplished on the scheduled work day in the farm field A8, the control unit 41 causes the work information icon B1, which corresponds to the farm field A8, to display the warning information Bm and highlight the background image Ba. When the spray work has been finished in the farm field A11 and then entry to the farm field is prohibited for a given period, the control unit 41 causes the background image Ba of the work information icon B1, which corresponds to the farm field A11, to be highlighted.

Also, in the higher position on the work information screen D11, the control unit 41 displays, with priority, the work information icon B1 which corresponds to the work plan that needs to be alerted to do the work as planned in the work plan. Also, the control unit 41 continues to display the warning information Bm until, for example, the work in the farm field A8 is finished. Also, the control unit 41 causes the background image Ba to be highlighted until, for example, the entry-prohibited period of the farm field A11 ends.

Figure 16:
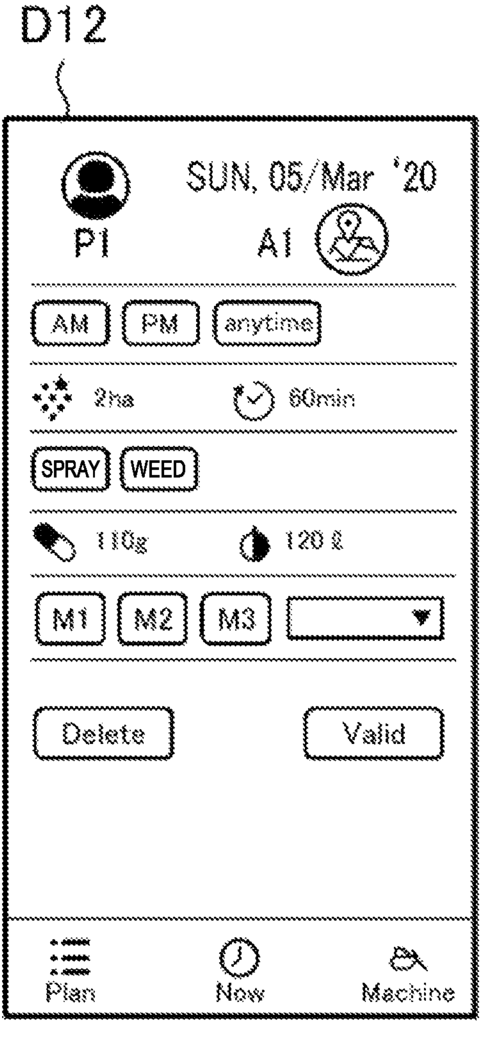
FIG. 16 is a diagram showing an example of a work plan screen displayed on the mobile operation terminal according to the embodiment of the present invention.

Also, on the work information screen D11, the worker can select the farm field F to be worked on the relevant day ("March 5"). For example, when the worker P1, on the work information screen D11, selects the work information icon B1 of the farm field A1, the control unit 41 causes a work plan screen D12, which includes the work plan of the farm field A1 that corresponds to the selected work information icon B1, to be displayed. FIG. 16 shows an example of the work plan screen D12. The work plan screen D12 displays the information on the work plan registered on the registration screen D1 (see FIG. 9). On the work plan screen D12, the worker P1 can check the work content on the relevant day ("March 5") in the farm field A1.

Also, the worker P1 can change the work content on the work plan screen D12.

For example, the worker P1 can change the work time, the work type (spraying, weeding, etc.), the spray amount, the model of the work vehicle 10, etc.

Figure 17:
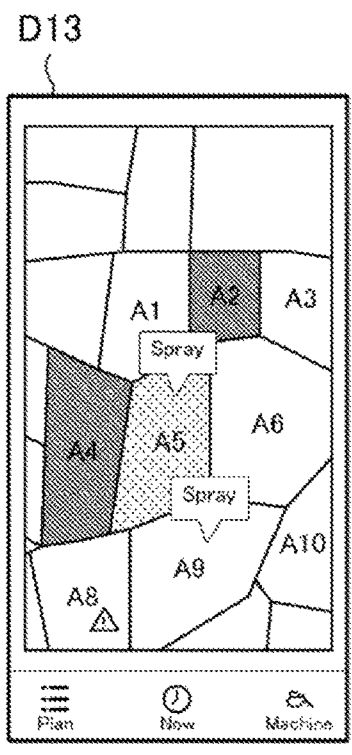
FIG. 17 is a diagram showing an example of a work status screen displayed on the mobile operation terminal according to the embodiment of the present invention.

Also, the control unit 41 causes the mobile operation terminal 40 to display the work status screen D13 which shows the current work status. FIG. 17 shows an example of the work status screen D13. The work status screen D13 displays the information same as the information in the work status screen D3 (see FIG. 12) which is displayed at the management operation terminal 30. The example shown in FIG. 17 shows that the spray work is currently underway in the farm fields A5 and A9.

Figure 18:
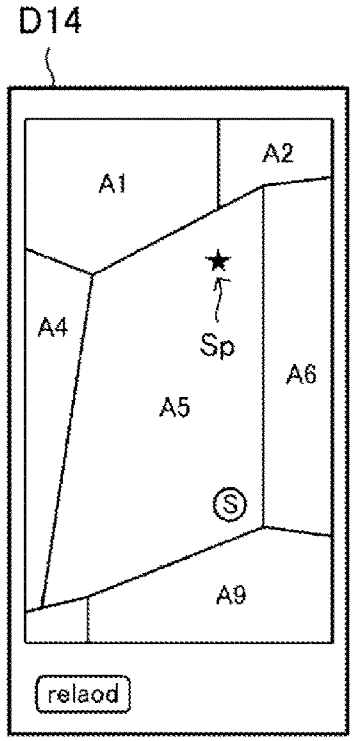
FIG. 18 is a diagram showing an example of a work position screen displayed on the mobile operation terminal according to the embodiment of the present invention.

When the work is interrupted and then is restarted, for example, the control unit 41 causes a restart position, which corresponds to an interruption position, to be displayed in a work position screen D14. FIG. 18 shows an example of the work position screen D14. For example, when the work is interrupted and then is restarted in the farm field A5, the control unit 41 causes a restart position Sp to be displayed in the interruption position in the farm field A5. This allows the worker to move the work vehicle 10 to the restart position Sp thereby to restart the work.

Figure 19:
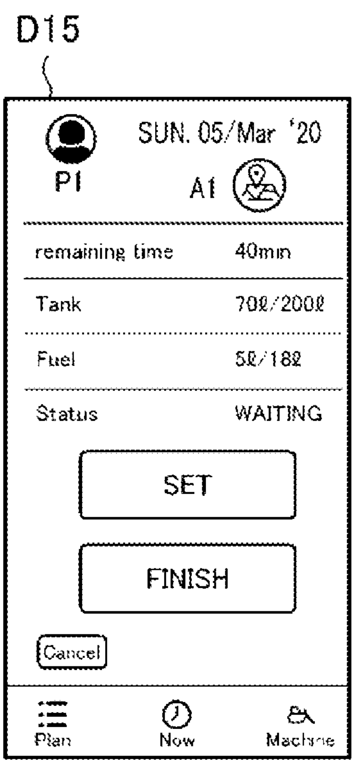
FIG. 19 is a diagram showing an example of an operation screen displayed on the mobile operation terminal according to the embodiment of the present invention.

Also, the control unit 41 may accept the work finish operation from the worker at the mobile operation terminal 40. For example, in the operation screen D15 shown in FIG. 19, when the worker presses down the finish button, the control unit 41 accepts the work finish operation and outputs the work finish instruction to the server 20.

When acquiring the above work finish instruction, the server 20 outputs the work stop instruction (stop signal) to the work vehicle 10. When acquiring the work stop instruction from the server 20, the vehicle control device 11 of the work vehicle 10 moves the work vehicle 10 to a given position thereby to stop the automatic travel and the work.

Also, in the operation screen D15, the control unit 41 accepts, from the worker, an input operation such as the work performance. When receiving the input operation of the work performance, the control unit 41 outputs the input operation to the server 20.

When acquiring the above work performance, the server 20 stores the work performance as the work history information.

[Work Management Process]

Figure 20:
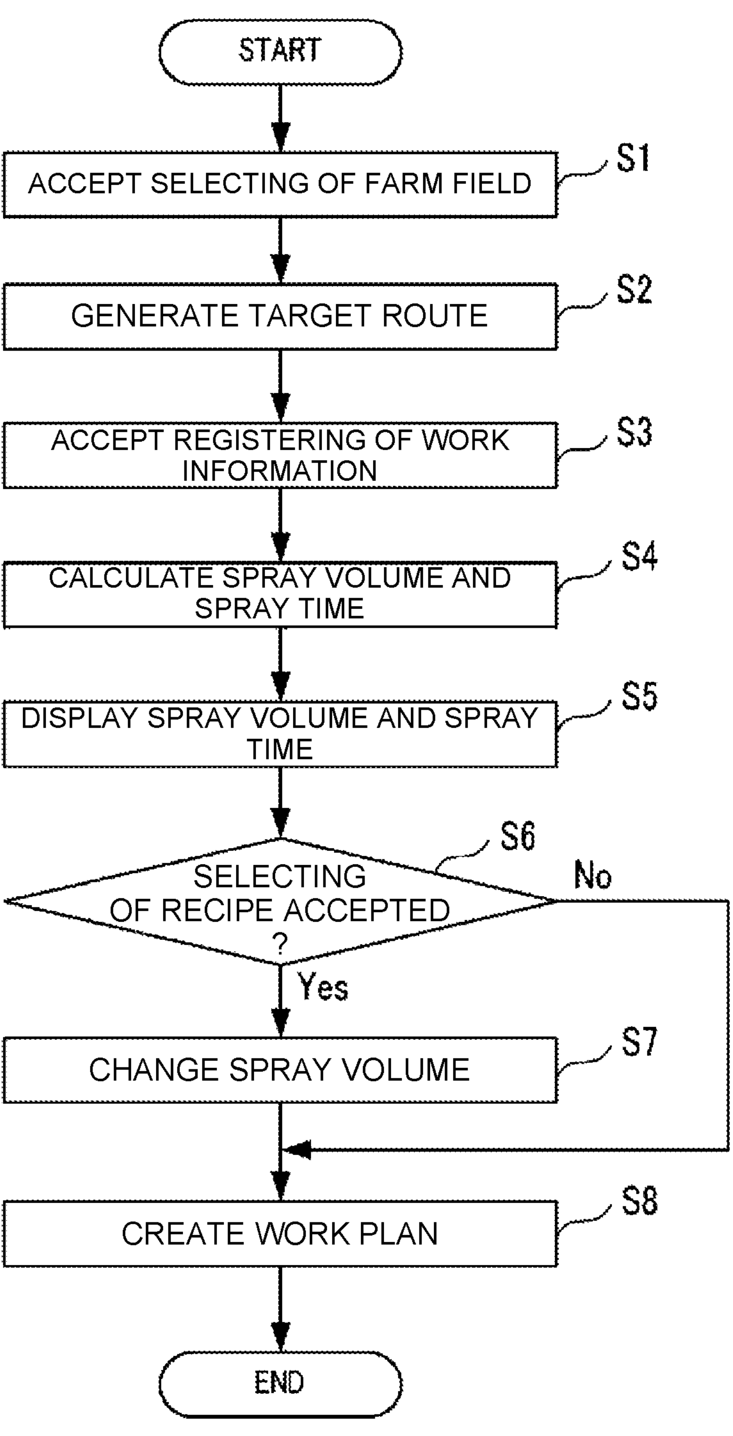
FIG. 20 is a flowchart showing an example of a procedure of a work management process (work plan creation process) executed by the automatic travel system according to the embodiment of the present invention.
Figure 21:
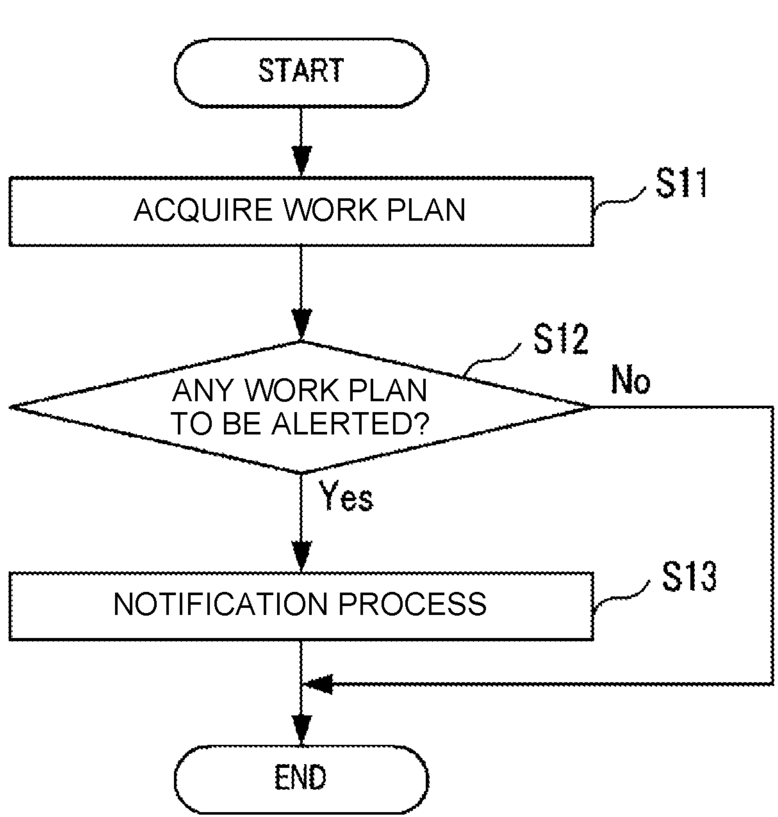
FIG. 21 is a flowchart showing an example of a procedure of the work management process (notification process) executed by the automatic travel system according to the embodiment of the present invention.

With reference to FIG. 20 and FIG. 21, an example of the above operation management process executed by the control unit 31 of the management operation terminal 30 is described below.

Also, the present invention may be regarded as an invention of an operation management method for executing one or more steps included in the above operation management process. Also, it is also possible to properly omit one or more steps included in the above operation management process described herein. Note that each step in the above operation management process may be executed in a different order as long as the same operational effect is brought about. Also, although a case in which the control unit 31 executes each step in the above operation management process is described here as an example, an operation management method in which one or more processors execute each step in the above operation management process in a distributed manner is also considered as another embodiment.

FIG. 20 is a flowchart showing an example of a procedure for executing a work plan creation process to create the work plan. FIG. 21 is a flowchart showing an example of a procedure for executing a notification process that notifies given notification information when it is necessary to make an alert so as to do the work as planned in the work plan. The above work plan creation process and the above notification process are included in the above work management process.

[Work Plan Creation Process]

With reference to FIG. 20, an example of the above work plan creation process executed by the control unit 31 of the management operation terminal 30 is described below.

In step S1, from the farm field manager, the control unit 31 accepts a selecting operation of the farm field F. For example, at the management operation terminal 30, the farm field manager, when creating the work plan, enters the user ID and password on the login screen thereby to log in. Then, the farm field manager selects the target farm field F on the registration screen D1 (see FIG. 9) displayed at the management operation terminal 30. Here, the farm field manager selects the farm field A1, for example.

Next, in step S2, the control unit 31 generates the target route R. Specifically, for the selected farm field F, the control unit 31 generates the target route R (see FIG. 8) based on the above work vehicle information, the above farm field information, the above work information, etc. Here, the control unit 31 generates the target route R for the farm field A1, for example.

Next, in step S3, the control unit 31 accepts a registration operation of various types of work information. Specifically, in the registration column R0 of the registration screen D1 (see FIG. 9), the farm field manager selects the scheduled work day, the work time, the work type, the worker, and the model of the work vehicle 10. The control unit 31 accepts the selecting operation of the farm field manager. The control unit 31 registers various types of work information according to the above selecting operation.

Next, in step S4, the control unit 31, based on the target route R, calculates the spray amount of chemical agent and the spray time of the spray work. For example, the control unit 31 calculates the spray time based on the information such as the area of the farm field A1, the travel speed of the work vehicle 10, the target route R, and the work machine. Also, the control unit 31 calculates the spray time based on the work history information (see FIG. 13) of the past spray work in the farm field A1.

Next, in step S5, the control unit 31 causes the registration screen D1 to display the above calculated spray amount and spray time (FIG. 9). Specifically, the control unit 31 causes the chemical agent column R5 and water content column R6 of the registration screen D1 to display the above calculated spray amount (total amount of chemical agent and total amount of water), and causes the work time column R3 of the registration screen D1 to display the above calculated spray time.

Next, in step S6, the control unit 31 determines whether or not a recipe selecting operation has been accepted. For example, when selecting the registered recipe based on the work history information (see FIG. 13), the farm field manager selects the icon of the chemical agent column R5 of the registration screen D1. On the recipe information screen Dr (see FIG. 14), the farm field manager selects the desired recipe from one or more recipes. When the farm field manager selects the recipe (SG: Yes), the control unit 31 moves the process to step S7. Meanwhile, when the farm field manager does not select the recipe (SG: No), the control unit 31 moves the process to step S8.

In step S7, the control unit 31 changes the spray amount according to the selected recipe.

Specifically, the control unit 31 calculates the spray amount based on the selected recipe, and changes the above spray amount calculated in step S4. When selecting of the recipe changes the above spray time, the control unit 31 changes the spray time accordingly. The control unit 31 updates the information in the chemical agent column R5 and the water content column R6, as well as the work time column R3.

In step S8, the control unit 31 creates the work plan. Specifically, the control unit 31 creates the work plan of the farm field F based on the work information registered by each of the above processes. Here, the control unit 31 creates the work plan that includes the work information (items R1 to R8) on the work to be done on "March 1" in the farm field A1.

The control unit 31 executes the work plan creation process, as described above. Also, the control unit 31 executes the above work plan creation process for each farm field F. Also, the control unit 31 outputs the created work plan data to the server 20. The data of the target route R may be included in the above work plan. The server 20 saves and manages the work plan and target route R for each farm field F.

As another embodiment, the control unit 31 may accept the recipe selecting operation after step S3. For example, when accepting the recipe selecting operation, the control unit 31 may calculate and display the spray amount and the spray time based on the selected recipe and thereby may create the work plan.

As another embodiment, the control unit 41 of the mobile operation terminal 40 may execute the above work plan creation process according to the worker's login operation.

[Notification Process]

With reference to FIG. 21, an example of the above notification process executed by the control unit 31 of the management operation terminal 30 is described below.

In step S11, the control unit 31 acquires the work plan. For example, the control unit 31 acquires plural work plans stored in the server 20. Specifically, when the farm field manager enters the user ID and password on the login screen at the management operation terminal 30 thereby to logs, the control unit 31 acquires the latest work plan at that time point. The server 20 acquires the work performance from the work vehicle 10 and the mobile operation terminal 40, and stores the above work performance as the work history information in association with the target work plan.

Next, in step S12, the control unit 31 determines whether or not the work plan (the first work plan of the present invention) that needs to be alerted for the work vehicle 10 to do the work as planned is present in the acquired work plans. Specific examples are shown below.

As a first example, the control unit 31 determines whether or not the work plan in which the work has not been finished at this time point is present in the plural work plans. Specifically, the control unit 31 refers to the work history information to determine whether or not, a work plan in which the scheduled work day before "March 5" has been registered and the work has not been finished is present as of "March 5". For example, when the worker fails to accomplish the work on the scheduled work day, or has forgot to do the work, information showing that the work has not been finished is registered in the above work history information.

As a second example, the control unit 31 determines whether or not the work plan for which the given number of days or more have elapsed from the work day, on which the previous work was done, to the current day is present in the plural work plans. Specifically, the control unit 31 refers to the above work history information, thereby to determine whether or not the work plan for which "5 days" or more have past from the work day of the previous spray work is present as of "March 5". The given number of days is set by the farm field manager's operation of the elapsed day button K3 (see FIG. 10).

As a third example, the control unit 31 determines whether or not the work plan in which the work content is work repeatedly done in a given cycle and the scheduled work day is not registered in the given cycle is present. Specifically, the control unit 31 determines whether or not the work plan in which the work content is the spray work repeatedly done in the given cycle (e.g., one or two weeks) and the scheduled work day is not registered in the above given cycle is present in the plural work plans.

As a fourth example, the control unit 31 determines whether or not the work plan in which the weather forecast for the scheduled work day is expected to be rainy is present in the plural work plans.

As a fifth example, the control unit 31 determines whether or not the work plan in which the work content is work in which entry to the farm field F is prohibited for a given period after the work vehicle 10 has done the work is present in the plural work plans.

When the determination result is positive in the determination process in each of the above examples, that is, when the work plan that needs to be alerted for the work vehicle 10 to do the work as planned in the work plan is present in the plural work plans (S12: Yes), the control unit 31 moves the process to step S13. Meanwhile, when the determination result is negative in the determination process in each of the above examples, i.e., when the work plan that needs to be alerted for the work vehicle 10 to do the work as planned in the work plan is not present in the plural work plans (S12: No), the control unit 31 finishes the above notification process.

In step S13, the control unit 31 executes the notification process that notifies the given notification information. The followings are the notification process's specific examples that correspond to the specific examples (first to fifth examples) of the above determination process.

In the above first example, the control unit 31 causes the farm field F, which corresponds to the work plan, to be identifiably displayed on the map Mp of the registration screen D1 shown in FIG. 10. For example, when, for the farm field A6, the work plan has been registered with "March 3" as the scheduled work day of the spray work, the control unit 31, by causing the background image Fs of the farm field A6 to be highlighted, causes the farm field A6 to be identifiably displayed, as shown in FIG. 10. As another embodiment, the control unit 31 may cause a flag to be displayed in the farm field A6.

Also, the control unit 31 causes the farm field F, which corresponds to the work plan, to be identifiably displayed on the schedule table Sd shown in FIG. 11. For example, when, for the farm field A6, the work plan has been registered with "March 3" as the scheduled work day of the spray work, the control unit 31 causes the warning information Cm to be displayed in a date column of "March 3" of the farm field A6, as shown in FIG. 11, and causes the background image of the above date column to be highlighted. Also, the control unit 31 causes the background image Fm of the name of the farm field A6 on the schedule table Sd to be highlighted.

In the above second example, the control unit 31 causes the number of days elapsed from the work day, on which the previous work was done, to the current day, to be displayed on the map Mp of the registration screen D1 shown in FIG. 10 in association with the farm field F. For the farm field A3, for example; when 5 days have elapsed from the work day of the previous spray work, the control unit 31 causes the day count flag Fg, which shows that 5 days have elapse, to be displayed in association with the farm field A3. In the example shown in FIG. 10, the farm fields A7 and A9 show that 6 days have elapsed from the work day of the previous spray work, and the farm field A10 shows that 7 days have elapsed from the work day of the previous spray work.

Also, the control unit 31 causes the number of days elapsed from the work day, on which the previous work was done, to the current day to be displayed (not shown), in association with the farm field F, on the schedule table Sd of the schedule screen D2 show in FIG. 11.

In the above third example, for example, when the spray work needs to be done every week in the farm field A8, and the spray work is done one week before the current day "March 5", and the work plan of the spray work is not registered for the current day, the control unit 31 causes the farm field A8 to be identifiably displayed on the map Mp. Also, the control unit 31 may cause the information, which prompts the registration of the work plan for the farm field A8, to be displayed.

Also, the control unit 31 causes the farm field A8, which corresponds to the above work plan, to be identifiably displayed (not shown) on the schedule table Sd of the schedule screen D2.

In the above fourth example above, when the work plan for which the weather forecast for the scheduled work day is expected to be rainy is present in the plural work plans, and when the scheduled work day of the given work content that needs to be done after the rain has not been registered, the control unit 31 causes the farm field F, which corresponds to the above work plan, to be identifiably displayed on the map Mp of the registration screen D1. For example, when it rained immediately after the spray work has been done on "March 4" in the farm field A12, for example, and the work plan of spray work has not been registered for the next day "March 5", the control unit 31 causes the farm field A12 to be identifiably displayed on the registration screen D1 of "March 5". The notification processing unit 316 may cause the information, which prompts the registration of the work plan of the spray work for the farm field A12, to be displayed.

Also, the control unit 31 causes the farm field F, which corresponds to the above work plan, to be identifiably displayed on the schedule table Sd of the schedule screen D2.

In the above fifth example above the control unit 31 causes the state, in which the farm field F that corresponds to the work plan prohibits entry for the given period, to be identifiably displayed on the map Mp of the registration screen D1. When 48 hours have not elapsed, as of the current time point, from the doing of the spray work for the farm fields A2, A4, and A11, for example, the control unit 31, by causing the background image Ft of each of the farm fields A2, A4, and A11 to be highlighted, causes each farm field to be identifiably displayed.

Also, the control unit 31 causes the state, in which the farm field F that corresponds to the above work plan prohibits entry for the given period, to be identifiably displayed on the schedule table Sd of the schedule screen D2.

When 48 hours have not elapsed from the doing of the spray work for the farm fields A2 an A4, for example, the control unit 31, by causing the background image C2 of each of the farm fields A2 and A4 to be highlighted, causes each farm field to be identifiably displayed on the schedule table Sd of the schedule screen D2 (see FIG. 11). Also, the control unit 31 may cause the entry-prohibited period at the past date, as in the farm field A1 and farm field A5, or may cause the entry-prohibited period on the current day or later (in the future), as in the farm field A5.

After the process in step S13, the control unit 31 finishes the notification process. The control unit 31 executes the above notification process each time the farm field manager logs in and accesses the registration screen D1.

As another embodiment, the control unit 41 of the mobile operation terminal 40 may execute the notification process according to the worker's login operation. In this case, the control unit 41 causes the mobile operation terminal 40 to display the above notification information.

As described above, the automatic travel system 1 according to the present embodiment acquires the work plan that mutually associates the farm field F (work site) in which the work vehicle 10 does the work, the work content of the work to be done by the work vehicle 10 in the farm field F, and the scheduled work day of the above work. Also, the automatic travel system 1 determines whether or not the work plan (first work plan) that needs to be alerted for the work vehicle 10 to do the work as planned in the above work plan is present in the plural work plans, and, when the above first work plan is present in the above plural work plans, the automatic travel system 1 causes the work information on the above first work plan to be displayed.

With the above configuration; when the work plan (first work plan) that needs to be alerted for the work vehicle 10 to do the work as planned in the work plan is present, the work plan including the work plan (the first example) in which the work has not been finished on the registered scheduled work day, the work plan (the second example) for which the given number of days or more have elapsed from the work day, on which the work was done, to the current day, the work plan (the third example) in which the scheduled work day is not registered in the given cycle, the work plan (the fourth example) in which the weather forecast for the scheduled work day is expected to be rainy, the work plan (the fifth example) of the farm field F that prohibits entry for the given period, and the like, the given notification information can be notified to the farm field manager, the worker, etc. This allows the farm field manager, the worker, and the like to know any work that is not progressing as planned in the work plan, any work that needs to be alerted, etc. That is, this can alert the farm field manager, the worker, and the like about the work plan. This makes it possible for the worker to know the work status which accords to the work plan. Then, the work in each farm field F can be properly done according to the work plan.

Also, the automatic travel system 1 according to the present embodiment calculates, based on the target route R of the work vehicle 10 that does the spray work on the spray target object placed in the farm field F, the spray amount of the spray matter to the above spray target object and the spray time of the above spray work, and causes the operation terminal (management operation terminal 30, mobile operation terminal 40, etc.) to display the above spray amount and the above spray time. Also, based on the above spray amount and the above spray time, the automatic travel system 1 creates the work plan of the above spray work which corresponds to the farm field F.

According to the above configuration, the farm field manager can know the spray amount and spray time of the chemical agent when creating the work plan of the spray work in the farm field F. This makes it possible to create the proper work plan that corresponds to the farm field F for doing the spray work. Thus, the spray work can be done as planned in the created work plan. Also, it is possible to prevent any improper chemical agent from being sprayed to the farm field F.

In the above embodiment, the automatic travel system 1 corresponds to the work management system according to the present invention, but the work management system according to the present invention may also include the management operation terminal 30 alone. Also, the work management system according to the present invention may include the server 20 alone or the mobile operation terminal 40 alone. For example, the server 20 may be provided with the calculation processing unit 314, determination processing unit 315, and notification processing unit 316 of the management operation terminal 30. Also, the mobile operation terminal 40 may be provided with the setting processing unit 311, display processing unit 312, creation processing unit 313, calculation processing unit 314, determination processing unit 315, and notification processing unit 316 of the management operation terminal 30. Also, it is also possible that the operation management system according to the present invention includes one or more component elements of the server 20, the management operation terminal 30, and the mobile operation terminal 40.

REFERENCE SIGNS LIST

1: automatic travel system
10: work vehicle
20: server
30: management operation terminal (operation terminal)
40: mobile operation terminal (operation terminal)
50: base station
60: satellite
311: setting processing unit
312: display processing unit
313: creation processing unit
314: calculation processing unit
315: determination processing unit
316: notification processing unit
D1: registration screen
D2: schedule screen
D3: work status screen
D4: work history screen
Dr: recipe information screen
F: farm field (work site)
Mp: map
R: target route
Sd: schedule table

The invention claimed is:

1. A processor-implemented operation management method for a work vehicle, comprising:

acquiring, by the processor, a work plan that mutually associates a work site where a work vehicle does work, work content of the work to be done by the work vehicle at the work site, and a scheduled work day to perform the work;

determining, by the processor, whether a first work plan that is associated with a corresponding first work status alert is present in a plurality of work plans for the work vehicle;

initiating, by the processor, based on the work status alert, a notification of a work information for the first work plan, when the first work plan is present in the plurality of work plans; and when the first work plan is present in the plurality of work plans, setting a target route based on the first work plan, and an instruction is sent from the server to automatically drive the work vehicle along the target route, wherein the work management method further sets the work status alert by determining whether at least a given number of days or more have elapsed from a work day, on which a previous work was done for the first work plan, to a current day, and initiating, as part of the notification, a display of the number of days elapsed from the work day to the current day in association with the first work site which corresponds to the first work plan, on at least one of a map or a schedule table displayed at an operation terminal.

2. The work management method according to claim 1, wherein the corresponding first work status alert for the first work plan is set when a corresponding completion status of work associated with the first work plan is incomplete.

3. The work management method according to claim 2, wherein initiating the notification of the work information for the first work plan comprises initiating display of the first work site, which corresponds to the first work plan, in an identifiable manner on at least one of a map or a schedule table displayed at an operation terminal.

4. The work management method according to claim 1, wherein the work management method further sets the work status alert by determining whether a weather forecast for a scheduled work day for the first work plan is expected to be a rainy day.

5. The work management method according to claim 4, further comprising initiating, as part of the notification, a display of the first work site, which corresponds to the first work plan, in an identifiable manner on at least one of a map or a schedule table which are displayed at an operation terminal, wherein the display is initiated when a scheduled work day for given work content associated with the first work plan is to be performed after the rainy day.

6. The work management method according to claim 1, wherein the work management method further sets the work status alert by determining whether the work content corresponding to the first work plan is scheduled during a prohibited entry period when entry to the work site is prohibited, and initiating, as part of the notification, a display of the work site that corresponds to the first work plan and the prohibited entry period, to be displayed in an identifiable manner on a schedule table displayed at an operation terminal.

7. The work management method according to claim 6, wherein the notification further comprises:

displaying the first work site, which corresponds to the first work plan, in an identifiable manner on a map displayed at the operation terminal.

8. An operation management system or a work vehicle comprising at least one processor, wherein the at least one processor further comprises:

an acquisition processing unit that acquires a work plan that mutually associates a work site where a work vehicle does work, work content of the work to be done by the work vehicle at the work site, and a scheduled work day to perform the work;

a determination processing unit that determines whether a first work plan that is associated with a corresponding first work status alert is present in a plurality of work plans for the work vehicle;

a notification processing unit that initiates, based on the work status alert, a notification of a work information for the first work plan, when the first work plan is present in the plurality of work plans; and when the first work plan is present in the plurality of work plans, a setting processing unit that sets a target route based on the first work plan, and an instruction is sent from the server to automatically drive the work vehicle along the target route, wherein the determination processing unit sets the work status alert by determining whether at least a given number of days or more have elapsed from a work day, on which a previous work was done for the first work plan, to a current day, and the notification processing unit initiates, as part of the notification, a display of the number of days elapsed from the work day to the current day in association with the first work site which corresponds to the first work plan, on at least one of a map or a schedule table displayed at an operation terminal.

9. A processor-implemented operation management method for a work vehicle, comprising:

acquiring, by the processor, a work plan that mutually associates a work site where a work vehicle does work, work content of the work to be done by the work vehicle at the work site, and a scheduled work day to perform the work;

determining, by the processor, whether a first work plan that is associated with a corresponding first work status alert is present in a plurality of work plans for the work vehicle;

initiating, by the processor, based on the work status alert, a notification of a work information for the first work plan, when the first work plan is present in the plurality of work plans; and when the first work plan is present in the plurality of work plans, setting a target route based on the first work plan, and an instruction is sent from the server to automatically drive the work vehicle along the target route, wherein the work management method further sets the work status alert by determining whether work content that is work repeatedly done in a given cycle on a scheduled work day for the first work plan is not registered in the given cycle, and initiating, as part of the notification, a display of the first work site, which corresponds to the first work plan, in an identifiable manner on at least one of a map or a schedule table displayed at an operation terminal.

* * * * *